United States Patent
Crompton

(10) Patent No.: US 7,229,680 B1
(45) Date of Patent: Jun. 12, 2007

(54) REALISTICALLY TEXTURED PRINTED FLOCKED FABRICS AND METHODS FOR MAKING THE FABRICS

(75) Inventor: Kevin R. Crompton, Westport, MA (US)

(73) Assignee: Microfibres, Inc., Pawtucket, RI (US)

( * ) Notice: Subject to any disclaimer, the term of this patent is extended or adjusted under 35 U.S.C. 154(b) by 395 days.

(21) Appl. No.: 09/666,813

(22) Filed: Sep. 21, 2000

Related U.S. Application Data

(60) Provisional application No. 60/155,077, filed on Sep. 21, 1999.

(51) Int. Cl.
B32B 33/00 (2006.01)
B32B 3/02 (2006.01)
B32B 3/26 (2006.01)

(52) U.S. Cl. .............................. 428/89; 428/88; 428/90; 428/919

(58) Field of Classification Search .................. 428/90, 428/88, 89, 96, 919
See application file for complete search history.

(56) References Cited

U.S. PATENT DOCUMENTS 774,890 A 11/1904 Mutterer (Continued)

FOREIGN PATENT DOCUMENTS

CA 2024768 3/1991

(Continued)

OTHER PUBLICATIONS

Examination Report for a corresponding Turkish patent application, serial No. 2002/00721, issued Apr. 2, 2004 by the Preliminary Examining Authority, Federal Institute of Intellectual Property, Russia.

(Continued)

Primary Examiner—Cheryl A. Juska
(74) Attorney, Agent, or Firm—Wolf, Greenfield & Sacks, P.C.

(57) ABSTRACT

The present invention is directed to unique flocked pile fabrics and methods for producing such fabrics. The fabrics provided according to one embodiment of the invention include an embossed pattern, characterized by a plurality of elongated depressions in the surface of the pile fabric, and a superimposed printed pattern, characterized by a scene or illustration including a plurality of visual features having elongated shapes. The inventive embossed, printed pile fabrics, having a superimposed embossed and printed pattern, advantageously superimpose the embossed pattern and the printed pattern upon the pile fabric so that the embossed pattern imparts a three-dimensional texture to the scene or illustration or pattern comprising the printed pattern. The texture provided by the embossed pattern can impart a visual effect to the scene or illustration which can render it more realistic than a similar scene or illustration printed upon a conventional unembossed pile fabric. In one embodiment, this unique texturing effect is accomplished by substantially aligning the longitudinal axes of the elongate features of the printed pattern and the elongate features of the embossed pattern. The pile fabric provided by the invention can be produced by utilizing a plurality of embossing and printing techniques. In one embodiment, the embossing technique comprises air embossing, and the printing technique comprises paper transfer printing utilizing a paper transfer sheet. The fabrics provided by the invention are especially useful as camouflage fabrics. Such fabrics typically include a printed scene or illustration representing a sylvan setting dominated by visual features such as trees, branches, bushes, leaves, flowers, berries, grass, rocks, moss, etc.

17 Claims, 11 Drawing Sheets

U.S. PATENT DOCUMENTS

| | | |
|---|---|---|
| 1,802,547 A | 4/1931 | Allen |
| 1,810,328 A | 6/1931 | Slater |
| 1,883,535 A | 10/1932 | Burnett |
| 1,912,625 A | 6/1933 | Dreyfus |
| 2,076,451 A | 4/1937 | Fallscheer |
| 2,160,828 A | 6/1939 | Cheney et al. |
| 2,182,321 A | 12/1939 | Rivat |
| 2,217,113 A | 10/1940 | Hardy |
| 2,221,232 A | 11/1940 | Clavel et al. |
| 2,242,182 A | 5/1941 | McCann |
| 2,255,615 A | 9/1941 | Frankel |
| 2,302,020 A | 11/1942 | Frederick, Jr. |
| 2,303,202 A | 11/1942 | Faris et al. |
| 2,308,429 A | 1/1943 | Smith et al. |
| 2,311,850 A | 2/1943 | Mantell |
| 2,366,926 A | 1/1945 | Melton |
| 2,368,706 A | 2/1945 | Fountain |
| 2,384,951 A | 9/1945 | Millar |
| 2,491,316 A | 12/1949 | Kirk |
| 2,563,259 A | 8/1951 | Miller |
| 2,642,835 A | 6/1953 | Winkel |
| 2,687,384 A | 8/1954 | Weisberg |
| 2,695,244 A | 11/1954 | Fountain |
| 2,766,720 A | 10/1956 | Müller et al. |
| 2,774,126 A | 12/1956 | Secrist |
| 2,848,974 A | 8/1958 | Lee, III |
| 2,900,278 A | 8/1959 | Powers et al. |
| 2,907,721 A | 10/1959 | Auer |
| 2,981,224 A | 4/1961 | Phelps |
| 3,050,415 A | 8/1962 | Brown |
| 3,079,212 A | 2/1963 | Fountain et al. |
| 3,099,514 A | 7/1963 | Haber |
| 3,339,525 A | 9/1967 | Roberts |
| 3,508,523 A | 4/1970 | De Meerleer |
| 3,568,594 A | 3/1971 | Johnston et al. |
| 3,669,818 A * | 6/1972 | Stark ............... 428/88 |
| 3,830,683 A | 8/1974 | Bohm |
| 3,849,157 A | 11/1974 | Palmer et al. |
| 3,849,158 A | 11/1974 | Palmer et al. |
| 3,849,159 A | 11/1974 | Palmer et al. |
| 3,868,214 A | 2/1975 | Shackleton |
| 3,916,823 A | 11/1975 | Halloran |
| 3,917,883 A | 11/1975 | Jepson |
| 3,945,791 A | 3/1976 | Bohrn |
| 3,958,507 A | 5/1976 | Mitter |
| 3,999,940 A | 12/1976 | Freeman |
| 4,014,648 A | 3/1977 | Walsh et al. |
| 4,018,066 A | 4/1977 | Fennekels et al. |
| 4,018,956 A | 4/1977 | Casey |
| 4,049,374 A | 9/1977 | Rejto |
| 4,108,595 A | 8/1978 | Pappas |
| 4,138,945 A | 2/1979 | Rejto |
| 4,147,813 A | 4/1979 | Casey |
| 4,223,057 A | 9/1980 | Rejto |
| 4,246,308 A | 1/1981 | Walsh |
| 4,248,652 A | 2/1981 | Civardi et al. |
| 4,255,150 A | 3/1981 | Fennekels et al. |
| 4,294,577 A | 10/1981 | Bernard |
| 4,309,179 A | 1/1982 | Heuser et al. |
| 4,314,813 A | 2/1982 | Masaki |
| 4,427,414 A | 1/1984 | Orton |
| 4,443,505 A | 4/1984 | Ehrenfeld, Jr. |
| 4,444,104 A | 4/1984 | Mitter |
| 4,497,095 A | 2/1985 | Minemura et al. |
| 4,497,249 A | 2/1985 | Mitter |
| 4,499,637 A | 2/1985 | Greenway |
| 4,612,874 A | 9/1986 | Mitter |
| 4,895,748 A | 1/1990 | Squires |
| 4,963,422 A | 10/1990 | Katz et al. |
| 5,031,525 A | 7/1991 | Kent et al. |
| 5,059,452 A | 10/1991 | Squires |
| 5,108,777 A | 4/1992 | Laird |
| 5,122,219 A | 6/1992 | Ludwig |
| 5,148,583 A | 9/1992 | Greenway |
| 5,202,077 A | 4/1993 | Marco et al. |
| 5,298,031 A | 3/1994 | Gabay et al. |
| 5,400,485 A | 3/1995 | Bialostozky-Krichevsky |
| 5,510,143 A | 4/1996 | Walsh et al. |
| 5,543,195 A | 8/1996 | Squires et al. |
| 5,685,223 A | 11/1997 | Vermuelen et al. |
| 5,756,180 A | 5/1998 | Squires et al. |
| 5,771,796 A | 6/1998 | Morrison et al. |
| 5,773,101 A | 6/1998 | Sanders |
| 5,861,044 A | 1/1999 | Crenshaw |
| 5,863,633 A | 1/1999 | Squires et al. |
| 5,981,021 A | 11/1999 | McCulloch |
| 6,247,215 B1 * | 6/2001 | Van Alboom et al. ........ 26/2 R |
| 6,350,504 B1 | 2/2002 | Alboom et al. |
| 6,376,041 B1 | 4/2002 | Morrison et al. |
| 6,770,240 B1 | 8/2004 | Laird et al. |
| 2001/0008039 A1 | 7/2001 | Alboom et al. |
| 2002/0043162 A1 | 4/2002 | Laird et al. |

FOREIGN PATENT DOCUMENTS

| | | |
|---|---|---|
| CA | 2084535 | 10/1993 |
| DE | 3419367 | 11/1984 |
| EP | 0507028 A1 | 10/1992 |
| FR | 2 346 162 | 10/1977 |
| JP | 54165414 | 8/1980 |
| JP | 63306598 | 6/1990 |
| WO | WO 92/20524 A1 | 11/1992 |
| WO | WO 96/29462 A1 | 9/1996 |
| WO | WO 97/37072 A1 | 10/1997 |
| WO | WO 98/18990 A1 | 5/1998 |
| WO | PCT/US00/13993 | 11/2000 |
| WO | WO 200071802 A1 * | 11/2000 |
| WO | WO 01/21878 A1 | 3/2001 |
| WO | WO 02/12608 A2 | 2/2002 |
| WO | WO 02/12608 A3 | 2/2002 |

OTHER PUBLICATIONS

K. Ember, "Transferbedruckte Polyester-Polware," Textilveredlung, vol. 12, No. 5, pp. 207-209 (1977).

Brenner et al., "Textile Flocking," Textilbeflockung. Date unknown but 1991 or earlier.

U. Zorll, et al., "Influences of composition and polarity of an adhesive on its bonding properties," Flock, vol. 14, No. 46, pp. 7-18 (1987).

H. Schubert, et al., "Colour Differences in Flock and Flocked Articles," Flock, No. 36, pp. 3-9 (1984).

L. Bayerwerk, "Adhesive Formulations for Flock Application," Farbenfabriken Bayer AG, pp. 2-14 (1964).

R. S. Gregorian, et al., "Flock Technology," American Association of Textile Chemists and Colorists, pp. 30-37 & Figs. 1-6 (AATCC Symposium, Dec. 8-9, 1971).

Examination Report for a corresponding Turkish Patent Application, Serial No. 2002/00721, issued Jul. 14, 2006 and copy of claims as pending as of that date.

United States District Court for the District of Connecticut (New Haven) bearing Docket No. 3:02-cv-01267-AVC - Docket Report as of Dec. 21, 2006.

United States District Court for the District of Connecticut (New Haven) bearing Docket No. 3:02-cv-01267-AVC - Second Amended Complaint of Apr. 12, 2004.

United States District Court for the District of Connecticut (New Haven) bearing Docket No. 3:02-cv-01267-AVC - Plaintiff Intermark Fabric Corporation's Memorandum of Law in Reply to Defendant's Opposition to Plaintiff's Motion for Summary Judgment of Aug. 25, 2003.

United States District Court for the District of Connecticut (New Haven) bearing Docket No. 3:02-cv-01267-AVC - Microfibres for Summary Judgment Under 35 U.S.C. §§ 102 and 103 of Oct. 14, 2003.

United States District Court for the District of Connecticut (New Haven) bearing Docket No. 3:02-cv-01267-AVC - Memorandum of Law in Support of Plantiff Intermark fabric Corporation's Motion for Summary Judgment of Jul. 21, 2003.

United States District Court for the District of Connecticut (New Haven) bearing Docket No. 3:02-cv-01267-AVC - Microfibres Inc.'s Memorandum of Law in Support of its Objection to Intermark Fabric Corporation's Motion for Summary Judgment of Aug. 11, 2003.

United States District Court for the District of Connecticut (New Haven) bearing Docket No. 3:02-cv-01267-AVC - Memorandum of Law in Support of Plaintiff, Intermark Fabric Corporation's Motion for Summary Judgment Under 35 U.S.C. §§ 102 and 103 of Sep. 22, 2003.

United States District Court for the District of Connecticut (New Haven) bearing Docket No. 3:02-cv-01267-AVC - Local Rule 56(A)1 Statement of Sep. 22, 2003.

United States District Court for the District of Connecticut (New Haven) bearing Docket No. 3:02-cv-01267-AVC - Plaintiff Intermark Fabric Corporation's Memorandum of Law in Reply to Defendant's Objection to Plaintiff's Motion for Summary Judgment Under §§ 102 and 103 of Oct. 28, 2003.

United States District Court for the District of Connecticut (New Haven) bearing Docket No. 3:02-cv-01267-AVC - Plaintiff Intermark Fabric Corporation's Answers to Defendant, Microfibres, Inc.'s First Set of Interrogatories of Aug. 12, 2003.

United States District Court for the District of Connecticut (New Haven) bearing Docket No. 3:02-cv-01267-AVC - Plaintiff Intermark Fabric Corporation's First Amended Answers to Defendant, Microfibres, Inc.'s First Set of Interrogatories of Aug. 21, 2003.

United States District Court for the District of Connecticut (New Haven) bearing Docket No. 3:02-cv-01267-AVC - Expert Report of Lawrence J. Goffney, Jr. of Jun. 2, 2003.

United States District Court of Connecticut (New Haven) bearing Docket No. 3:02-cv-01267-AVC - Expert Rebuttal Report of David Brookstein, Sc.D. Matters Related to U.S. Appl. No. 5,981,021 of Jul. 31, 2003.

United States District Court for the District of Connecticut (New Haven) bearing Docket No. 3:02-cv-01267-AVC - Local Rule 56(A)1 Statement of Jul. 21, 2003.

United States District Court for the District of Connecticut (New Haven) bearing Docket No. 3:02-cv-01267-AVC - Microbres, Inc.'s Local Rule 9(c)(2) Statement of Aug. 11, 2003.

United States District Court for the District of Connecticut (New Haven) bearing Docket No. 3:02-cv-01267-AVC - Microfibres, Inc.'s Local Rule 56(a)2 Statement of Oct. 14, 2003.

United States District Court for the District of Connecticut (New Haven) bearing Docket No. 3:02-cv-01267-AVC - Plaintiff Intermark Fabric Corporation's Opposition to Defendant, Microfibres, Inc.'s Motion in Limine to Exclude Evidence Relating to "Best Mode" Defense of Sep. 25, 2006.

United States District Court of Connecticut (New Haven) bearing Docket No. 3:02-cv-01267-AVC - Plaintiff Intermark Fabris Corporation's Notice of Prior Art Under U.S.C. § 282 of Aug. 18, 2006.

United States District Court for the District of Connecticut (New Haven) bearing Docket No. 3:02-cv-01267-AVC - Joint Trial Memorandum of Aug. 28, 2006.

* cited by examiner

REALISTICALLY TEXTURED PRINTED FLOCKED FABRICS AND METHODS FOR MAKING THE FABRICS

RELATED APPLICATIONS

This application claims priority from co-pending provisional specification 60/155,077, filed Sep. 21, 1999.

SUBJECT MATTER OF THE INVENTION

The present invention relates to flocked fabrics having superimposed embossed patterns and printed patterns creating a realistically three-dimensionally textured scene, illustration, or pattern.

BACKGROUND OF THE INVENTION

Pile fabrics formed by flocking or other methods are frequently embossed to form a wide range of surface patterns and textures. Known methods for embossing a pile fabric include running the fabric through one or more cylinders bearing an engraved pattern thereon and subjecting the pile surface of the fabric to selective amounts of heat and pressure for selected periods of time in order to form depressed regions within the pile fabric corresponding to the engraved pattern on the cylinders. Another common method of embossing pile fabrics is through the use of air embossing equipment. Air embossing involves passing a pile fabric, while an adhesive to which the pile is adhered is still uncured, under one or more air streams and subsequently curing the adhesive. In typical methods for air embossing, the fabric is air embossed by passing the fabric under a cylinder including a plurality of apertures therein, and applying a pressurized air flow to an inside surface of the cylinder so that the air flows through the apertures in the cylinder, impinges upon the pile layer of the fabric, and forms depressions therein, which depressions are made permanent upon subsequent curing of the adhesive.

Printing and/or dyeing of fabrics, including pile fabrics, is also known in the art. Such prior art methods include submerging the fabrics in dye solutions, screen printing techniques, such as rotary screen printing, and transfer paper printing techniques, typically involving applying a surface of a printed transfer paper to a surface of a fabric and using heat and pressure to transfer a printed pattern from the transfer paper to the surface of the fabric. In typical prior art methods for forming pile fabrics, textured patterns and printed patterns are typically either not simultaneous present on a given fabric, or are essentially independent from each other and uncoordinated in appearance. Typical prior art pile fabrics include embossed and/or printed patterns that are typically characterized by essentially regular geometric shapes and features presenting an essentially uniformly appearing repeating pattern to the eye of the observer. Such prior art fabrics, and their methods of manufacture, while useful for many purposes, such as for upholstery, certain items of clothing (especially indoor clothing), etc., are not well suited for applications requiring fabrics which allow a wearer thereof, or an object covered therewith, to blend into a natural environment, and such prior art fabrics are not well suited for realistically depicting a printed scene or illustration.

There remains a need in the art to provide textured and printed flocked pile fabrics providing embossed and printed patterns thereon more realistically simulating a scene or illustration, for example a natural sylvan scene or illustration. The present invention provides textured and printed flocked pile fabrics, and methods for producing such fabrics, providing a more realistic visual effect or simulation of printed scenes or illustrations, which are especially useful in the context of camouflage or other fabrics for outdoor use and apparel.

SUMMARY OF THE INVENTION

The present invention is directed to unique flocked pile fabrics and methods for producing such fabrics. The fabrics provided according to the invention include an embossed pattern characterized by a plurality of elongated depressions in a surface of the pile fabric, and a superimposed printed pattern characterized by a scene or illustration including a plurality of visual features having elongated shapes. The inventive embossed, printed pile fabrics, having a superimposed embossed and printed pattern thereon, advantageously superimpose the embossed pattern and the printed pattern upon the pile fabric so that the embossed pattern imparts a three-dimensional texture to the scene or illustration comprising the printed pattern. The texture provided by the embossed pattern imparts a visual effect to the scene or illustration which renders it more realistic than a similar scene or illustration printed upon a conventional unembossed pile fabric. In one embodiment, this unique texturing effect is accomplished by substantially aligning the longitudinal axes of the elongate features of the printed pattern and the elongate features of the embossed pattern. The pile fabric provided by the invention may be produced by utilizing a plurality of embossing and printing techniques. In one preferred embodiment, the embossing technique comprises air embossing, and the printing technique comprises a transfer paper printing technique utilizing a paper transfer sheet. The fabrics provided by the invention are especially useful as camouflage fabrics. Such fabrics typically include a printed scene or illustration representing a sylvan setting dominated by visual features such as trees, branches, bushes, leaves, flowers, berries, grass, rocks, moss, etc.

In one aspect, a fabric is provided. The fabric comprises a substrate layer, an adhesive layer disposed on one surface of the substrate layer, and at least one layer of pile attached to and extending from the adhesive layer. The pile layer has an embossed pattern thereon. The embossed pattern includes a plurality of visually discernible regions having generally elongate shapes with longitudinal axes of the shapes being oriented substantially along a first direction. The pile layer further includes a printed pattern superimposed upon the embossed pattern. The printed pattern includes a plurality of visual features having generally elongate shapes with longitudinal axes of the shapes also being oriented substantially along the first direction.

In another embodiment, a fabric comprising a substrate layer, an adhesive layer disposed on one surface of the substrate layer, and at least one layer of pile attached to and extending from the adhesive layer is provided. The pile layer has superimposed thereupon an embossed pattern and a printed pattern. The printed pattern is characterized by a scene or illustration and the embossed pattern imparts a three-dimensional texture to the scene or illustration. The texture imparts a visual effect to the scene or illustration which renders it more realistic than the scene or illustration without the superimposed embossed pattern.

In another embodiment, a camouflage fabric is provided. The camouflage fabric comprises a layer of air-textured pile having printed thereon an illustration of a sylvan setting dominated by a component selected from at least one of the group comprising trees, branches, bushes, leaves, flowers, berries, grass, rocks and moss. The texturing comprising a random overlay on the illustration of depressions that are non-uniform in length and width.

In another aspect, a method for embossing and printing a pile fabric is disclosed. The method comprises embossing a pile fabric to form an embossed pattern thereon, where the embossed pattern includes a plurality of visually discernible regions having generally elongate shapes with longitudinal axes of the shapes being oriented substantially along the first direction. The method further comprises printing the fabric with a printed pattern that includes a plurality of visible features having generally elongate shapes with longitudinal axes of the shapes also being oriented substantially along the first direction.

In another embodiment, a method for embossing and printing a pile fabric is disclosed. The method comprises embossing a pile fabric to form an embossed pattern thereon, printing the fabric with a printed pattern, where the printed pattern is characterized by a scene or illustration, and orienting and superimposing the embossed pattern and printed pattern such that the embossed pattern imparts a three-dimensional texture to the scene or illustration. The texture imparts a visual effect to the scene or illustration which renders it more realistic than the scene or illustration without the superimposed embossed pattern.

In another aspect, a camouflage fabric is provided. The camouflage fabric is produced by a method comprising air embossing a pile fabric to form an air embossed pattern thereon, where the air embossed pattern includes a plurality of visually discernable regions having generally elongate shapes with longitudinal axes of the shapes being oriented substantially along a first direction. The method further includes printing the fabric with a printed pattern, where the printed pattern depicts an illustration of a sylvan setting that includes a plurality of visible features having generally elongate shapes with longitudinal axes of the shapes being oriented substantially along the first direction.

In another embodiment, camouflage fabric produced by a method comprising air embossing a pile fabric to form an air embossed pattern thereon and printing the fabric with a printed pattern characterized by a scene or illustration of a sylvan setting is produced. The method further involves orienting and superimposing the embossed pattern and the printed pattern during the printing step such that the embossed pattern imparts a three-dimensional texture to the sylvan setting, such that the texture imparts a visual effect to the sylvan setting which renders it more realistic than the sylvan setting without the superimposed embossed pattern.

In another embodiment a fabric is disclosed. The fabric comprises a substrate layer, an adhesive layer disposed on one surface of the substrate layer, and at least one layer of pile attached to and extending from the adhesive layer. The pile layer has superimposed thereupon an embossed pattern and a printed pattern. The printed pattern is characterized by a scene or illustration, and the superimposed embossed pattern imparts a three-dimensional texture to the scene or illustration that is characterized by the color and shading of the portions of the printed pattern superimposed on depressions of the embossed pattern visually differing from the color and shading of essentially equivalent portions of the printed pattern that are not superimposed on the depressions, thus yielding an enhanced visual representation of color and texture of the scene or illustration.

In yet another embodiment, a camouflage fabric is disclosed. The fabric comprises a layer of embossed pile having printed thereon a scene, illustration or pattern selected to visually blend into a surrounding environment in which the fabric is to be utilized. The fabric is also embossed with a texturing pattern that comprises an overlay on the scene, illustration or pattern of depressions that are shaped and oriented so as to create an embossed texture decreasing the degree of visual contrast between the camouflage fabric and the surrounding environment in which the fabric is to be utilized over that of the an equivalent camouflage fabric except without the embossed texture.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIG. 1c is a cross-sectional schematic illustration taken along line c—c of the pile fabric shown in FIG. 1a;

FIG. 2b is a photocopy showing a plan view of an embossed, unprinted pile fabric similar to the fabric shown in FIG. 2a;

FIG. 2c is a cross-sectional schematic illustration taken along line c—c of the embossed pile fabric of FIG. 2a;

DETAILED DESCRIPTION OF THE INVENTION

Figure 1A:
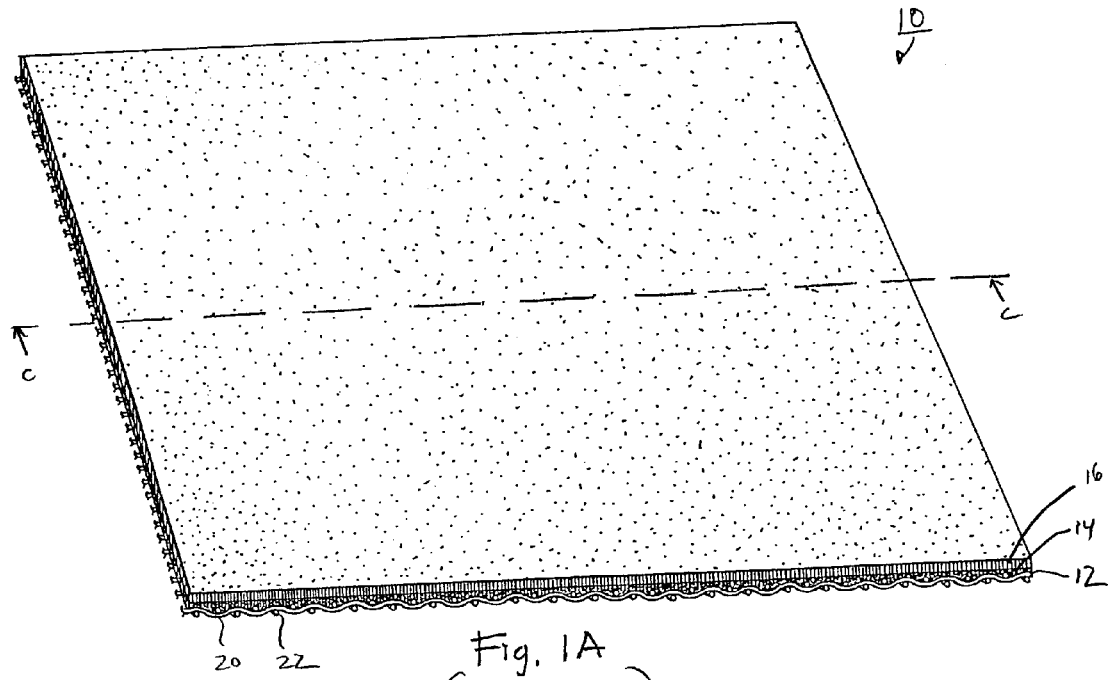
FIG. 1a is a schematic perspective view of an unembossed, unprinted pile fabric.

The present invention provides flocked pile fabrics, and methods for producing such fabrics, which include both an embossed pattern and a superimposed printed pattern on the pile layer of the pile fabrics. The textured and printed pile fabrics produced according to the invention in some preferred embodiments, include printed patterns characterized by a scene or illustration of a setting, for example a natural scene or setting, and further include an embossed pattern superimposed thereupon, where the shape and character of the embossed features and the printed features together creates a visual effect which imparts a realistic three-dimensional texture to the scene or illustration.

A "scene or illustration" as used herein refers to a printed pattern including at least some printed features depicting one or more objects as they could appear to a viewer in their natural setting. It should be understood that such "scene or illustration" need not impart to such objects in a high level of realistic detail (e.g. photographic detail), so long as the identity of such objects are apparent to a typical viewer. "Imparting a realistic three-dimensional texture to a scene or illustration," or "imparting a visual effect to a scene or illustration which renders it more realistic," or "yielding an enhanced visual representation of a scene or illustration" as used herein refers to a superposition of the embossed features of the embossed pattern and at least some of the printed features of the scene or illustration creating a texture on such printed features which visually simulates the natural texture of the particular object depicted by the printed feature. As just one example, the a printed feature can depict a tree and the superimposed textured pattern on the printed feature can simulate the natural texture of tree bark.

In some particularly preferred embodiments the textured and printed pile fabrics produced according to the invention can comprise camouflage fabrics having printed thereon a scene or illustration, or other type of pattern, selected to visually blend into a surrounding environment in which the fabric is to be utilized so as to make the fabric less visible to a human or animal than a comparable fabric without the pattern. Any of a wide variety of patterns typically used and well known in the art for producing camouflage fabrics, including scenes or illustrations of sylvan settings (defined below) and/or geometric patterns, which are not scenes or illustrations but which enable a fabric to visually blend into a surrounding environment, can be used within the scope of the present invention and can potentially be improved in their camouflaging ability by the inventive texturing methods. By superimposing an embossed pattern upon a printed camouflage pattern on a pile fabric according to the teachings of the invention, the degree of visual contrast between the fabric and the surrounding environment for which the camouflage pattern is selected (i.e. the ease with which a typical human and/or animal viewer can visually distinguish and perceive an object covered with such fabric from the surroundings, as measured for example by the time after first viewing that such distinguishment takes place or the maximum distance at which such distinguishment can occur, etc., as would be apparent to those of ordinary skill in the art of camouflage) can be decreased over a similarly printed but untextured fabric. In preferred embodiments, the degree of visual contrast can be decreased by at least about 5%, more preferably at least about 10%, more preferably at least about 15%, and most preferably at least about 25%. For embodiments where the inventive techniques are used to decrease the visual contrast of camouflage fabrics, such decrease can occur via, for example, by imparting a visual effect to a scene or illustration of the camouflage pattern which renders it more realistic and/or by reducing the reflectivity of the pile surface of the fabric, thereby reducing the amount of glare produced by the fabric, and/or by other optical effects.

As explained in more detail below, such visual effects can be created, in some embodiments, by superimposing an embossed pattern, having a plurality of embossed regions with generally elongate shapes, which regions are preferably non-uniform in length and width, with a printed pattern that includes a plurality of visually dominant features (e.g., prominent foreground features) that are also generally elongate in shape and that are substantially aligned in a direction similar to that of the direction of orientation of the embossed pattern. When superimposed, such an embossed pattern and printed pattern can cooperate to form the overall visual effects mentioned above. The fabrics provided according to the invention are especially effective for providing realistic representations of textures for printed patterns characterized by scenes or illustrations representing a sylvan setting. Such fabrics are particularly well suited for use as camouflage fabrics, where the ability to blend in with natural surroundings, most typically sylvan surroundings, is important to the function and utility of the fabric.

A "sylvan setting," or "sylvan scene," or "sylvan illustration" refers herein to a setting, scene, or illustration pertaining to or characteristic of woods or forest regions. Such scenes or illustrations are typically dominated by visual features including, for example, trees, branches, bushes, leaves, flowers, berries, grass, rocks, moss, etc. As described in more detail below, the inventive method for superimposing an embossed pattern and a printed pattern depicting a scene or illustration representing a sylvan setting, can yield an embossed fabric where the embossed pattern, when superimposed with the printed pattern, is able to realistically simulate a bark-like appearance (i.e., is able to impart a realistic bark-like texture to the tress, branches, etc., of the printed scene or illustration as defined above).

Figure 1B:
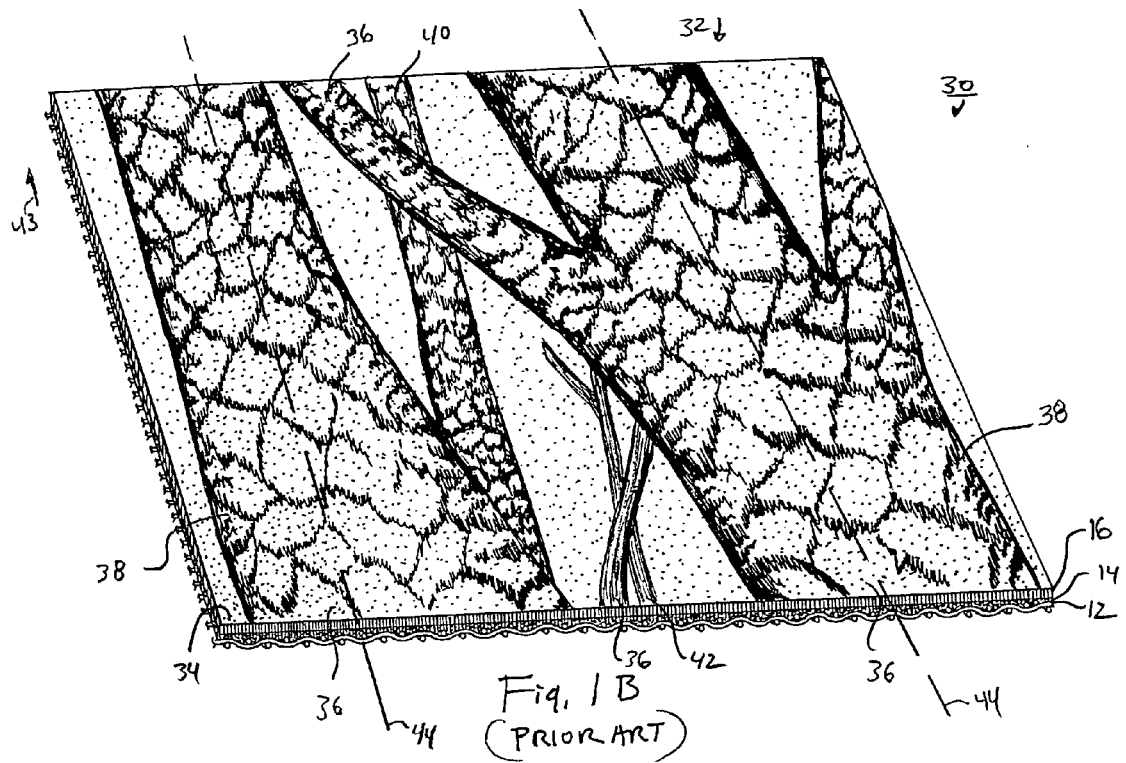
FIG. 1b is a schematic perspective view of an unembossed pile fabric having a printed scene thereon.
Figure 1C:
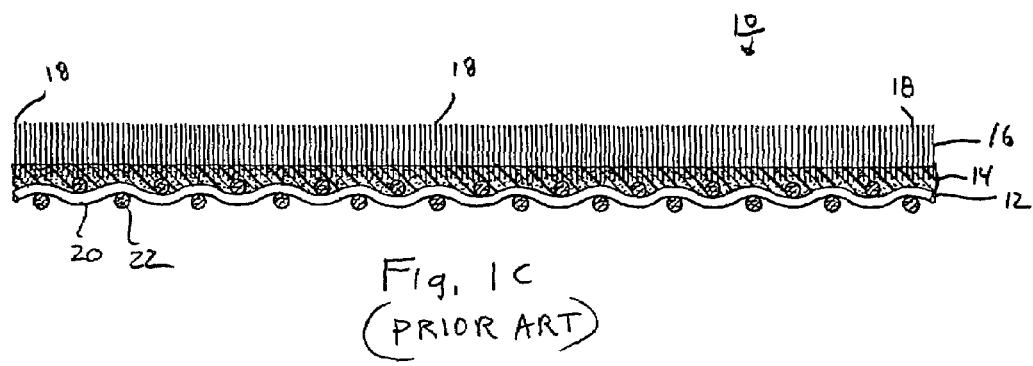

A conventional flocked fabric 10, which is unembossed and unprinted, is shown in FIG. 1a, and in cross-section in FIG. 1c. The fabric is comprised of a substrate layer 12 which is coated by an adhesive layer 14, which is, in turn, coated by a pile layer 16 that is comprised of a plurality of short lengths of pile fiber 18 that adhere to adhesive layer 14. As shown in FIG. 1c, for an unembossed pile fabric, the individual pile fibers 18 are typically oriented essentially parallel to each other and essentially perpendicular to the surface of the adhesive layer 14 in which they are embedded.

Substrate 12 as shown is comprised of a woven fabric formed by warp yarns 20 and filling yarns 22. Substrate 12 can be formed from a variety of woven materials incorporating natural and/or synthetic fibers, or combinations thereof. In one particular embodiment, the substrate can comprise a poly-cotton blend of 65%/35% having a weight in the order of 3.0 to 3.5 oz/sq yd. While in the illustrated embodiment, a woven fabric is shown as a substrate, it should be understood that in other embodiments, substrate 12 may be any type of material suitable for flocking with a pile layer, such as a variety of woven fabrics, non-woven fabrics, knitted fabrics, porous or non-porous plastic and paper sheets, and the like, as apparent to those of ordinary skill in the art.

Adhesive layer 14 can be any conventional adhesive known in the art for use in fabricating flocked pile fabrics. Such adhesives include a wide variety of water based and/or solvent based adhesives. Also, as apparent to those of ordinary skill in the art, the adhesives may further include such components as viscosity modifiers, plasticizers, thermosetting resins, curing catalysts, stabilizers, and other additives well known in the art. The viscosity and composition of the adhesive chosen can be selected according to criteria readily apparent to those of ordinary skill in the art, including, but not limited to, the porosity and composition of substrate 12, the desired cure time and technique employed, the particular method of depositing pile fibers 18 onto the adhesive, the final weight and hand of the pile fabric desired, etc. In one particular embodiment, adhesive layer 14 comprises an acrylic polymer adhesive, which is applied on substrate 12 to have an essentially uniform thickness and a coating density of about 2.0 to 3.0 oz/sq. yd. of pile fabric. For a more detailed discussion of adhesives and various additives which can be used for forming adhesive layer 14, the reader is referred to U.S. Pat. No. 3,916,823 to Halloran, incorporated herein by reference.

Pile fibers 18 comprising pile layer 16 may similarly be comprised of a wide variety of natural and/or synthetic fibers according to the particular desired characteristics of pile fabric 10. In a preferred embodiment, pile layer 16 is comprised of pile fibers 18 formed from a synthetic polymer material. In even more preferred embodiments, pile fibers 18 comprise nylon fibers. Fibers 18 for flocking may be natural in color or dyed, depending on the particular application, and pile layer 16 may be formed of pile fibers 18 which are all of the same color, thus forming a pile face 16 having a solid color, or from a plurality of pile fibers 18 having different colors, thus forming a pile face 16 that is multi-colored. For use in the present invention, where a printed pattern is transferred to the pile fabric, it is preferred to use pile fibers of the same color or undyed pile fibers.

The length of pile fibers 18, their denier, and the number density of the pile fibers on adhesive layer 14 can be varied over a relatively wide range and selected to yield a pile fabric having desirable characteristics for a particular application, as would be apparent to those of ordinary skill in the art. In one typical embodiment, pile fibers 18 can have an overall length between about 0.025 in and about 0.08 in, a denier between about 0.6 and about 3.5, and an overall pile density of between about 1.0 to about 3.5 oz/sq. yd. of fabric. Pile layer 16 can be deposited on the adhesive coated substrate, as discussed in more detail below, by a variety of methods conventional in the art, including the use of flocked depositing equipment of the beater bar type, or electrostatic flocking equipment, such as described in more detailed in commonly-owned U.S. Pat. No. 5,108,777 to Laird incorporated herein by reference.

FIG. 1*b* shows an unembossed pile fabric 30, similar to that shown in FIG. 1*a*, with a printed pattern 32 printed on upper surface 34 of pile layer 16. Printed pattern 32 depicts an illustration of a sylvan setting including visible features 36 characterized by tree trunks 38, limbs 40, and branches 42. While the particular scene or illustration printed upon pile fabric 30 is obviously a matter of design choice, patterns involving scenes or illustrations depicting sylvan settings or other scenes involving prominent visual features which, in their real life form, are typically textured, are preferred for use in forming the flocked fabrics according to the invention. Also preferred, are printed patterns which include prominent visible features that have generally elongate shapes, such as visible features 36 of printed pattern 32. As explained in more detail below, printed patterns with prominent visible features that are elongate in shape are particularly well suited for use in the current invention. Even more preferably, at least some fraction of the visible features 36 can have generally elongate shapes with longitudinal axes 44 of the shapes being oriented substantially along at a given direction 43 with respect to an edge of a fabric, thus giving the printed pattern an overall visual effect of being aligned in a particular direction.

A "generally elongate shape" as used herein refers to a shape having an aspect ratio differing from one or, in other words, having an overall length substantially greater than its overall width. In some embodiments, at least some features of a printed or embossed pattern have a generally elongate shape with an aspect ratio of at least about two, in other embodiments at least about five, in other embodiments at least about ten and in yet other embodiments at least about twenty. A "longitudinal axis" as used herein refers to a line which bisects an elongate shape along the direction of the shape's largest dimension. "Oriented substantially" or "substantially aligned" in a particular direction as used herein refers to longitudinal axes of features or regions being oriented so that they appear to be at least roughly visually aligned or correlated with the particular direction. Generally, the longitudinal axes of such regions will form an angle with respect to such a particular direction of that is less than about 45°, in some embodiments less than about 25°, and in some embodiments less than about 10°. It should be understood, however, that the orientation of the longitudinal axes of the elongate shapes with respect to a particular direction of the fabric, and the orientation of the longitudinal axes of features or regions of the with respect to each other may vary substantially from feature to feature without effecting the overall visual effect of a visual perception of alignment of the printed pattern, which visual effect defines herein whether the features or regions of the pattern are oriented substantially in the a given particular direction. It is also to be understood that, according to the invention, not every visible feature or region of the pattern need be oriented substantially along the given particular direction. For example, in some preferred embodiments, the printed pattern may, in addition to including substantially aligned visible features, can also include some number of visible features or regions which are not oriented substantially along the given particular direction. In such embodiments, such non-oriented visible features may typically comprise smaller, less visually prominent, or background features. In yet other embodiments, the inventive visual effects described above can be accomplished utilizing printed and/or embossed patterns having features without any substantial degree of visual alignment in a particular direction.

Figure 1D:
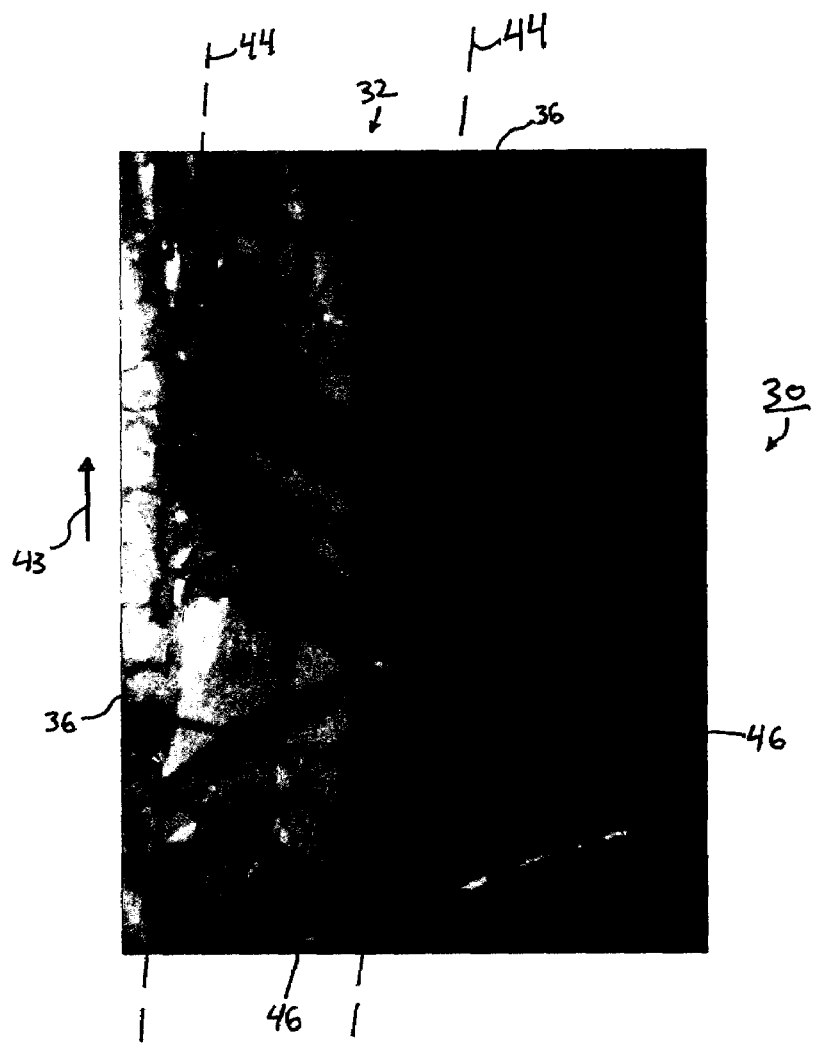
FIG. 1d is a photocopy of a photograph showing a plan view of an unembossed, printed pile fabric similar to that shown in FIG. 1b.

Referring again to FIG. 1*b*, printed pattern 32 can be transferred to flocked fabric 30 by a variety of conventional techniques known in the art, and discussed in more detail below, including, but not limited to, screen printing, transfer paper printing, painting, air brush, etc., as apparent to those of ordinary skill in the art. FIG. 1*d* shows a photocopy of a photograph of a printed but unembossed pile fabric 30 including prominent visible features 36 characterized by tree trunks and a variety of background visible features 46 depicting various branches or twigs. What should be noted is that the printed pattern 32 on the surface of unembossed pile layer 16 imparts a visually flat, untextured, and relatively unrealistically depicted illustration of a sylvan setting.

Figure 2A:
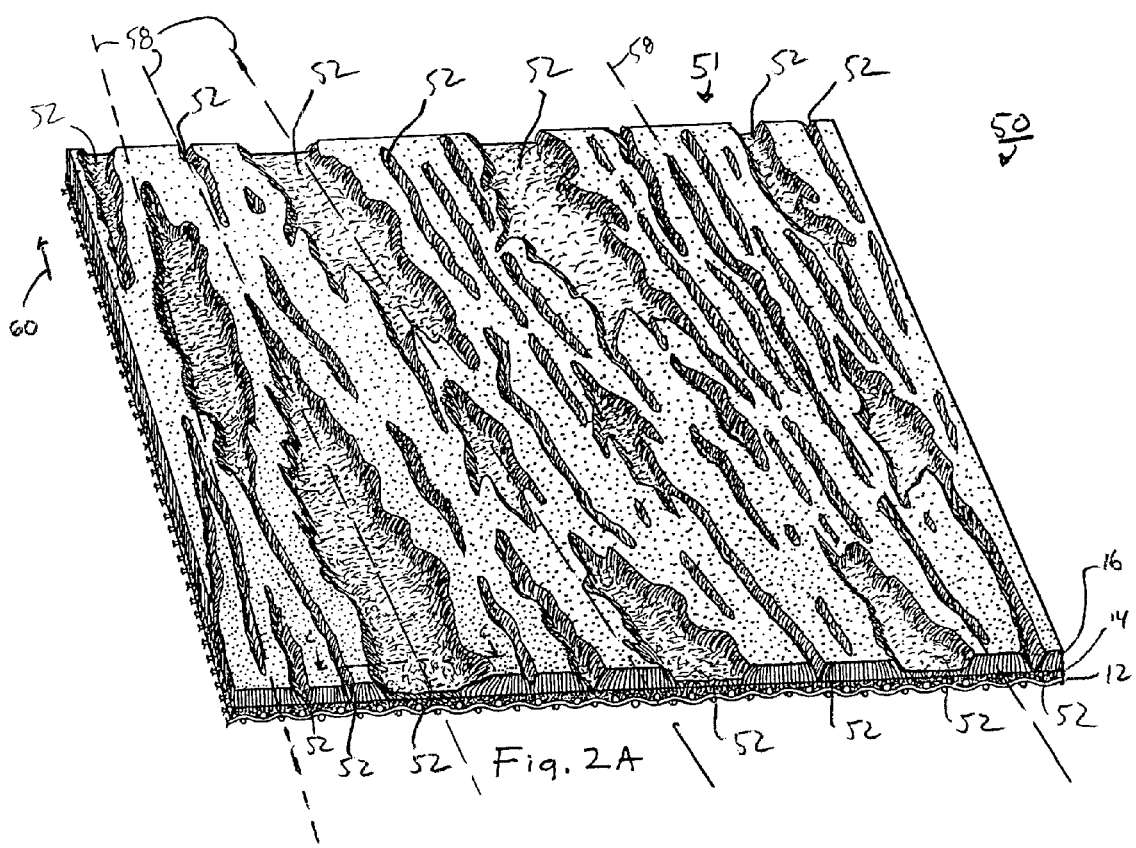
FIG. 2a is a schematic perspective view of an embossed pile fabric produced in accordance with the present invention.
Figure 2D:
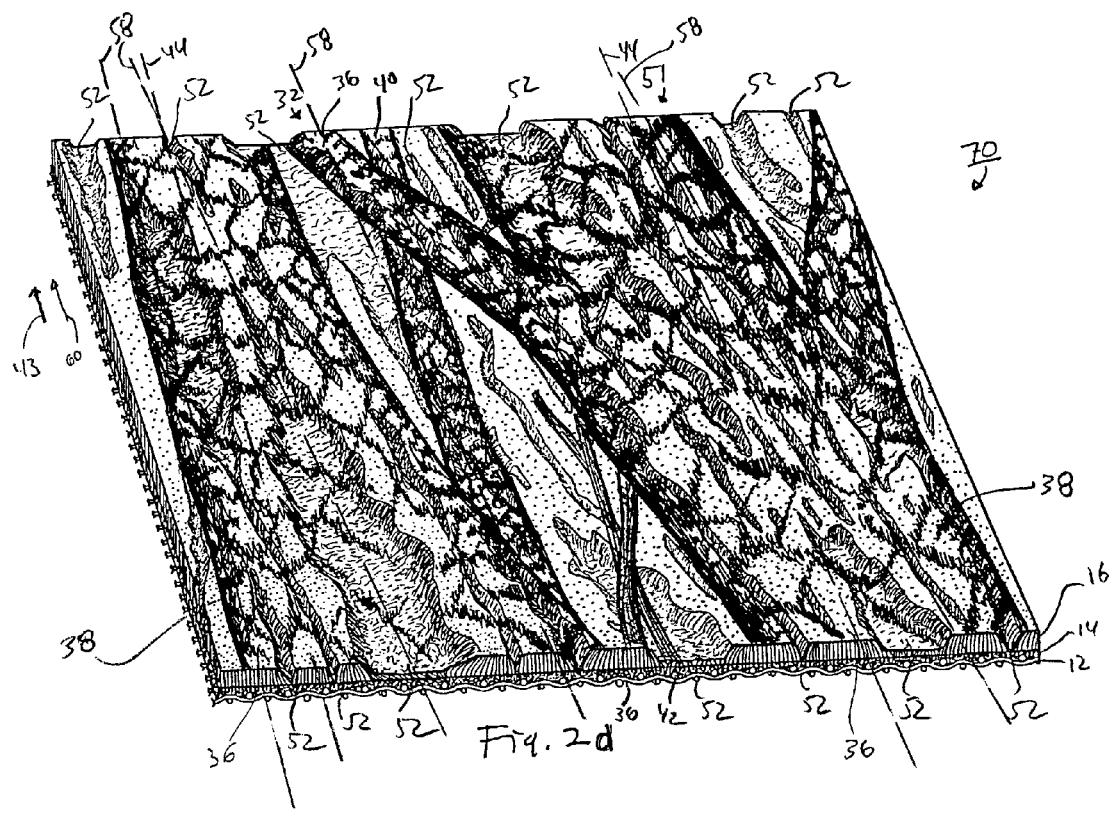
FIG. 2d is a schematic perspective view of the embossed pile fabric of the FIG. 2a having a printed pattern superimposed thereupon.

As discussed above, the present invention provides, in some embodiments, flocked pile fabrics including a printed illustration or scene or pattern and having an embossed pattern superimposed thereon, which embossed pattern is able to impart a thee-dimensional texture to the scene or illustration or pattern, which texture in turn imparts a visual effect to the scene or illustration that renders it more realistic to the viewer and/or renders it better able to blend into the surroundings than an equivalent scene or illustration or pattern but without the superimposed embossed pattern, for example as shown previously in FIGS. 1b and 1d. FIG. 2a shows a pile fabric 50, according to the invention, that has been embossed with a plurality of visually discernable regions 52 characterized by depressions in pile layer 16. For clarity, and to better illustrate and describe the overall shape and orientation of depressions 52, embossed pile fabric 50 is shown without a superimposed printed pattern thereon. FIG. 2b shows a photo image of embossed pile fabric 50.

Figure 2C:
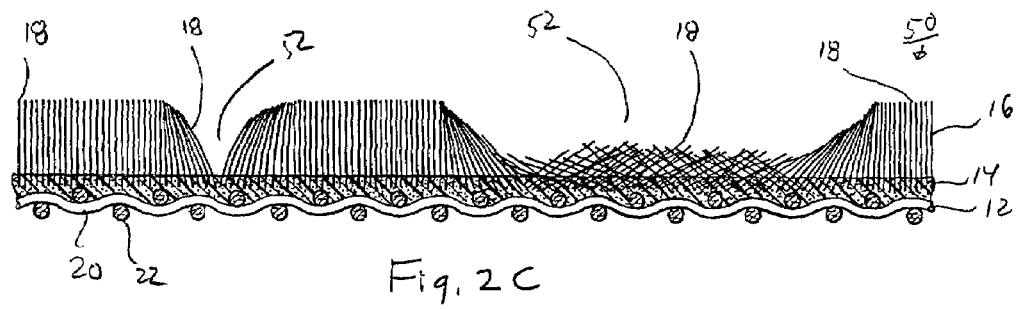
Figure 2B:
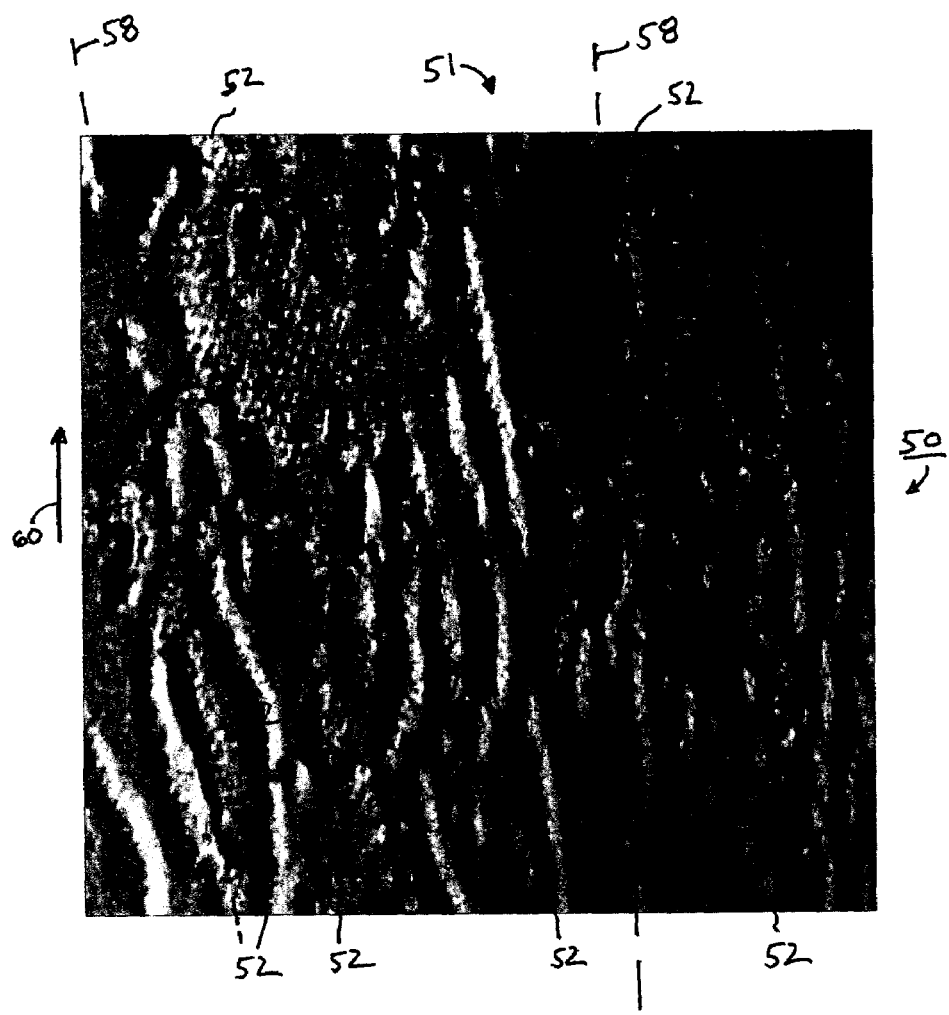

As shown most clearly in FIG. 2c, depressions 52 comprise depressed regions of pile fabric 50 wherein the direction and orientation of pile fibers 18 have been disrupted to form the visually discernible regions in embossed pattern 51. Referring again to FIG. 2a, embossed pattern 51 is comprised of a plurality of depressions 52 that are substantially non-uniform in length and width, when compared one to the other, but which are characterized by having generally elongate shapes with longitudinal axes 58 of the shapes being oriented substantially along a given direction 60. The terms "generally elongate shape," "longitudinal axis," and "oriented substantially" along a given direction in the context of describing embossed regions 52 have essentially the same meaning as the previous definitions given in the context of the orientation of the generally elongate visible features of printed pattern 52 described previously in the context of FIG. 1b. As shown in FIG. 2a, embossed depressions 52 can have a wide variety of overall shapes, sizes, and relative length to width ratios, but are generally shaped and oriented so as to impart an overall visual effect of an alignment of embossed pattern 51 in overall general direction 60. As will be described in greater detail below, the unique and inventive visual effects achieved by the fabrics provided according to the present invention can be derived, in some preferred embodiments, due to the substantial alignment between the visually discernible regions of the embossed pattern and the visible features of the printed pattern superimposed thereupon.

The pile fabric can be embossed with embossed pattern 51 using a variety of well known and conventional techniques in the art including, but not limited to, embossing methods utilizing metal or rubber cylinders having an engraved pattern thereon that are used to apply heat and pressure to the pile fabric forming an embossed pattern within the pile fabric that is complementary to an engraved pattern on the cylinder, and air texturing and/or embossing techniques, where the depressions of the embossed pattern are formed by a flow of pressurized air impinging upon a flocked pile fabric. While any technique for embossing and/or texturing a flocked pile fabric known in the art can potentially be useful for producing the embossed patterns according to the invention, as described in more detail below, a preferred method for forming the embossed patterns according to the invention utilizes an air embossing technique.

Figure 2E:
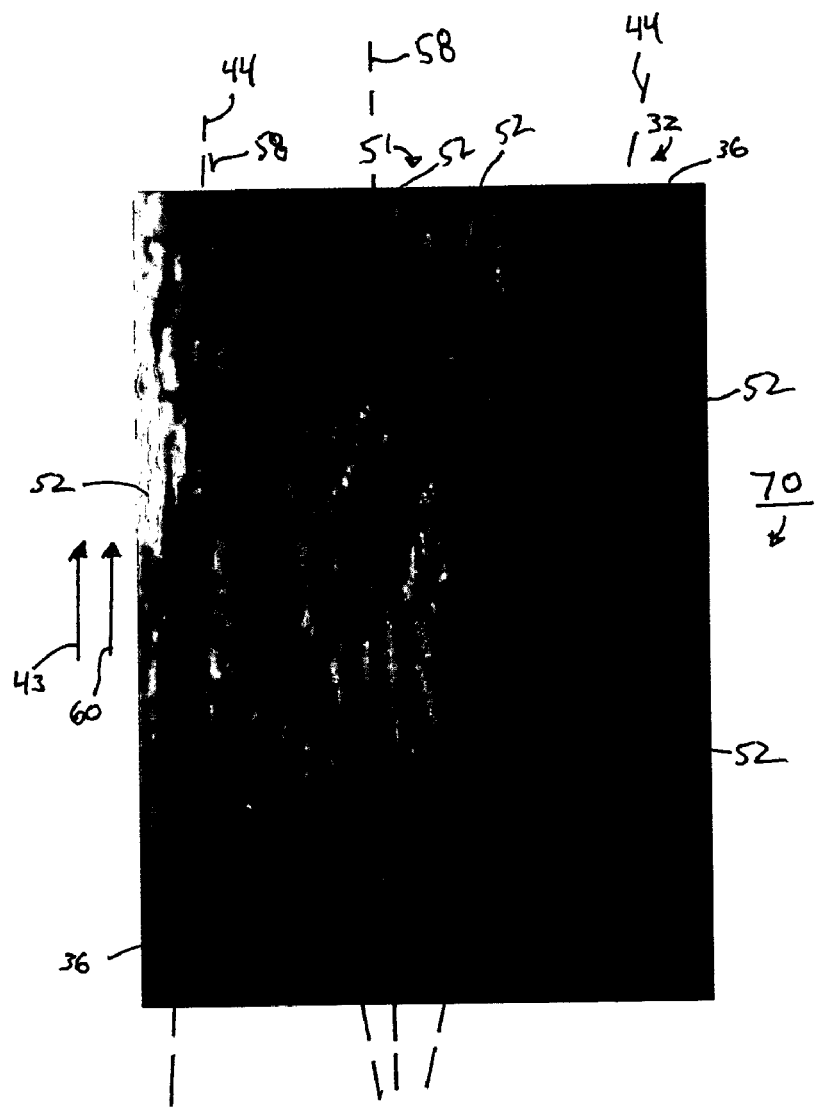
FIG. 2e is a photocopy showing a plan view of an embossed pile fabric having a printed pattern superimposed thereupon, according to the invention, similar to the pile fabric shown in FIG. 2b.

A fabric made in accordance with a preferred embodiment of invention is best illustrated in FIGS. 2d and 2e which show a flocked pile fabric 70 including a superposition or overlay of printed pattern 32 and embossed pattern 51. As is clearly visible in FIG. 2d, and is even more visually striking in FIG. 2e (which shows a photocopy of a photo image of embossed and printed pile fabric 70), when embossed pattern 51 is superimposed on printed pattern 32 in the manner shown, embossed pattern 51 creates a distinct and unique visual effect imparting three-dimensional texture to the sylvan setting illustrated by printed pattern 32. This texture gives the printed illustration a substantially more realistically textured appearance than when printed on unembossed pile fabric as shown previously in FIGS. 1b and 1d. In the illustrated embodiment, where printed pattern 32 is characterized by a series of tree trunks, limbs, and branches, superimposed embossed pattern 51 is effects a simulated a bark-like texture and appearance to the features.

The unique and realistic texturing and visual effect discussed above is accomplished, in the illustrated embodiment of the invention, by superimposing printed pattern 32 and embossed pattern 51 so that the longitudinal axes 44 of certain prominent visible features of the printed pattern, such as tree trunks 38 are oriented substantially along a given direction 43, while the longitudinal axes 58 of a plurality of embossed depressions 52 are oriented substantially along a given direction 60, where direction 43, describing the overall visual alignment of features of printed pattern 32, and direction 60, describing the overall visual alignment of embossed pattern 51 are substantially aligned with respect to each other (i.e. each direction 60 and 43 is substantially aligned with respect to the other direction). In other words, the overall visual directional orientation 43 of printed pattern 32 is substantially similar to the overall directional orientation 60 of embossed pattern 51, thus creating a substantial degree of visual alignment between the features of the printed pattern and the embossed regions of the embossed pattern. It should be reemphasized at this point that the visual alignment of the printed pattern and embossed pattern which, according to some embodiments of the invention, creates a realistic texturing effect for a printed scene or illustration, is to be judged from the standpoint of its overall visual effect on the eyes of a typical viewer. In other words, as discussed previously, some fraction of the regions and features of the patterns may have longitudinal orientations which are substantially different from each other or from a given direction defining an overall orientation of the majority of the most visually prominent features or regions while still yielding the overall visual effect. In addition, the overall visual orientation of the printed pattern (e.g., along direction 43) and the overall visual orientation of the embossed pattern (e.g., along direction 60) need not be exactly parallel to each other in order to impart the inventive visual effects described above, but the overall orientations of the printed and embossed patterns are preferably aligned at least to a degree sufficient to impart a realistic texturing pattern to the scene or illustration printed on the pile fabric (e.g., for embodiments such as that shown in FIGS. 2d and 2e, the overall orientation of the printed pattern and the overall orientation of the embossed pattern would typically differ from each other by less than about 45°, more preferably less than about 25°, and more preferably less than about 10°.).

One important feature of the inventive pile fabrics provided by the invention is the superposition of an embossed pattern and a printed pattern such that the embossed pattern supplies a texture to the scene or illustration or pattern depicted by the printed pattern, which texture provides a visual effect that more realistically simulates the natural texture of the scene or illustration depicted and/or renders the printed pattern better able to function as camouflage. Therefore, although in the embodiment illustrated in FIGS. 2d and 2e involving an illustration of a sylvan setting including a plurality of trees, limbs, and branches, the realistic visual effect of providing a bark-like texture to the visual features of the printed pattern is accomplished by substantially aligning the longitudinal axes of visible features of the printed pattern and longitudinal axes of depressions in the embossed pattern so that they are oriented in a substantially similar direction, it is also contemplated, that for other embodiments involving other types of scenes or illustrations or patterns, that the overall alignment between the orientation of the printed features and the embossed features may be different from that shown, in order to achieve a desired visual effect. For example, in some embodiments, it may be desirable to orient the longitudinal axes of the printed features with respect to the longitudinal axes of the embossed features so that they are essentially perpendicular to each other, or are neither substantially co-aligned nor perpendicular with each other, but rather are aligned having some intermediate angle with respect to each other, or are essentially randomly aligned with each other in order to more effectively and realistically simulate the natural texture of the printed scene or illustration and/or render the printed pattern better able to function as camouflage. All such fabrics having superimposed printed patterns and embossed patterns, where the orientation and shape of the embossed regions of the embossed pattern are selected to impart a realistic and natural texturing to the scene or illustration represented by the printed pattern and/or render the printed pattern better able to function as camouflage, are deemed to be within the scope of the present invention.

For the embodiment shown in FIGS. 2d and 2e, the visually discernible regions of 52 of embossed pattern 51 and visible features 36 of printed pattern 32 are superimposed upon each other so that they are essentially randomly positioned with respect to each other. "Essentially randomly oriented with respect to each other" when used in the context of describing the relative positioning of the printed and embossed features of a fabric with a superimposed printed and embossed pattern refers to the features being not correlated with each other such that particular individual features of each pattern are consistently and deliberately positioned in a predetermined spatial relationship with respect to each other across the length and width of the fabric. This definition does not exclude the printed pattern and the embossed pattern from individually being regular and repetitive across the length and width of the fabric (as indeed occurs when employing the preferred printing and embossing methods described below), but rather refers to their being no predetermined or required correlation between the particular locations of the individual features of the printed pattern with respect to the embossed pattern, such that the repetitive embossed pattern can be superimposed upon the repetitive printed pattern registration of the patterns in the direction of repetition.

Generally, it is preferable to create an embossed pattern, such as pattern 51 shown, which can be superimposed upon a printed pattern such that the features of each pattern are essentially randomly oriented with respect to each other, as defined above, in order to create a realistic visual texturing effect. As previously described, for such embodiments, the particular location of the embossed regions of the embossed pattern and the visual features of the printed pattern do not need to be positioned in any particular way with respect to each other. This may be accomplished, as in the illustrated embodiment, by utilizing printed patterns and embossed patterns each including features which are substantially similar, to other features within the pattern, in overall size, orientation, shape, and distribution across the entire surface of the pile fabric being created. In other words, such patterns advantageously enables a similar texturing effect over essentially their entire area in order to impart a realistic visual effect to the scene or illustration represented by the pattern. In other embodiments, but less preferably, the printed pattern may depict a scene or illustration having a series of discreet regions or features thereof which require different degrees or types of texturing in order to create a realistic visual effect. When such patterns are employed, the embossed pattern utilized for superimposing upon the printed pattern would include particular regions therein having differing types of embossed regions (i.e., having differing shapes, sizes, orientations, etc.) which would be correlated to particular features of the printed pattern, and which would have to be precisely aligned with such features, when superimposing the embossed pattern and printed pattern, in order to achieve a realistically textured visual effect. In such embodiments, the features of each pattern would not be essentially randomly oriented with respect to each other, as defined above. As will be described in more detail below, since the processes employed, in preferred embodiments, for embossing and printing patterns on pile fabrics are typically operated in a continuous fashion utilizing long rolls of fabrics, embodiments involving printed and embossed patterns each having features which must be precisely positioned with respect to each other are typically more expensive and difficult to implement in production and, therefore, are somewhat less preferred.

For embodiments where the embossed pattern is formed in the pile fabric using an embossing technique utilizing callendering of the pile fabric with engraved, heated rollers, the order in which the embossed pattern and the printed pattern are formed on the surface of a pile fabric is not particularly important. In one such embodiment, an unprinted unembossed pile fabric, such as fabric 10 shown in FIG. 1a, may first be imprinted with a printed pattern to form a printed, unembossed pile fabric, such as fabric 30 shown in FIG. 1b, which fabric may then be subsequently embossed to form the inventive pile fabric as shown in FIG. 2d. In other embodiments, unembossed, unprinted pile fabric 10 may first be embossed to form an embossed, unprinted fabric, such as fabric 50 shown in FIG. 2a, which fabric may then be subsequently printed with a printed pattern to form the inventive pile fabric, such as shown in FIG. 2d. However, as mentioned previously, a preferred method for embossing the pile fabrics according to the invention involves utilizing an air embossing technique. In such techniques, because the pile fabric must be embossed shortly after depositing pile fibers onto the adhesive layer (before the adhesive layer is cured) it is typically not possible to print the printed pattern onto the pile fabric before forming the embossed pattern.

Figure 3A:
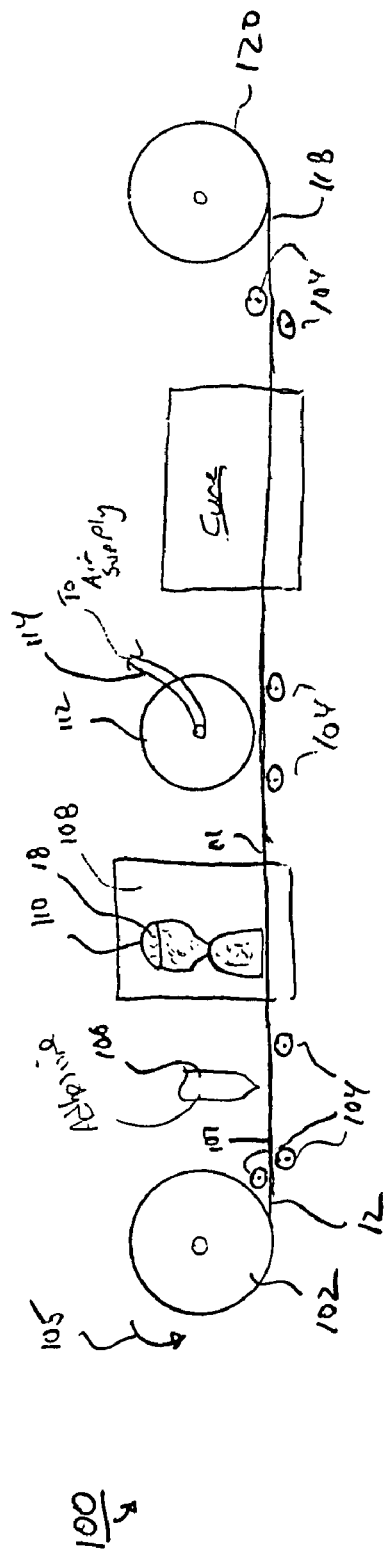
FIG. 3a is a schematic diagram of a process for embossing a pile fabric according to one embodiment of the invention.

FIG. 3a illustrates a preferred method for forming and embossing a flocked pile fabric according to the invention. Air embossing system 100 shown in FIG. 3a can be essentially conventional in design and can be operated by methods well known to those of ordinary skill in the art. Such methods and systems for air embossing have been utilized extensively in the prior art and are described in more detail, for example, in U.S. Pat. No. 3,916,823 to Halloran, previously referred to. One preferred method and system for air embossing the pile fabric is described below and in commonly owned co-pending International Application No. PCT/US00/13993 to Laird et al., filed in the United States Receiving Office and designating the United States entitled: "Systems and Methods for Air Embossing Fabrics Utilizing Improved Air Lances" incorporated herein by reference.

The process for producing an embossed pile fabric, for example similar to fabric 50 shown previously in FIG. 2a, can proceed as described below. Roll 102 of a substrate 12 can be conveyed, in the direction indicated by arrow 105, under tension from substrate roll 102 to take up roll 120 via conventional motor drive mechanisms for controllably driving one roll (i.e. take up roll 120) or both rolls. The fabric can be guided and supported along the path of the process via a series of support rollers 104. In other embodiments, instead of, or in addition to, conveying the fabric via motor-driven rotation of the take up roll/substrate roll, the fabric may be moved through the system via a conventional conveying system, such as a belt or apron conveyor. An adhesive layer is then applied to substrate 12 by a conventional adhesive applicator 106, for example a roll coater, curtain coater, doctor blade, etc. Typically, the adhesive is applied to the substrate by a printing method, although other methods such as paint spraying and silk-screening may be used. In a preferred embodiment, an adhesive layer is applied to the entire upper surface 107 of substrate 12.

Substrate 12, now coated with an adhesive layer, is then passed to flocking chamber 108, which includes a pile applicator 110. In flocking chamber 108, as is conventional for producing flocked fabric, a layer of flocking formed by a multiplicity of fibers 18 is applied to the adhesive. Conventionally, and as hereinafter described, this deposition may be achieved by conventional beater bar or electrostatic techniques in which the ends of the pile fibers 18 adhere substantially to the adhesive layer. Pile fibers 18, in preferred embodiments, are oriented essentially perpendicularly to the adhesive layer. In some preferred embodiments, flocking chamber 108 may comprise an alternating current electrostatic flocking device having a variable frequency alternating electrostatic field that optimizes flocked fiber characteristics and processing efficiency, such as that described in commonly owned U.S. Pat. No. 5,108,777 to Laird incorporated herein by reference.

After application of a pile layer, the flocked substrate 111 is passed under air embossing cylinder 112, which is in fluid communication with pressurized air supply line 114. As described in more detail below, air embossing cylinder 112 typically includes a cylindrical screen or stencil having perforations and solid areas therein. Also as described in more detail below, pressurized air from air supply line 114 is typically directed through the apertures or perforations in the cylindrical screen or stencil of embossing cylinder 112, in order to form the embossed depressions within the pile layer of the fabric. An embossed pattern is formed by deflection of pile fibers 18 in the pile layer by air flowing through the apertures within the cylindrical screen or stencil of embossing cylinder 112. Upon flowing through the apertures in the stencil of embossing cylinder 112 the air impinges upon pile fibers 18 and orients them in a direction that is dictated by the air pressure, flow, and size of the aperture through which the air passes. In other words, those portions of the pile layer passing underneath apertures within the cylindrical stencil will become oriented to form the depressions in the embossed pattern, whereas those portions passing under solid areas of the stencil will not be subject to substantial air flow or reorientation of pile fibers 18 in the pile layer. As will be apparent to those of ordinary skill in the art, it is important that the adhesive layer be in an uncured state during the air embossing procedure, such that the pile fibers 18 are not rigidly held by the adhesive and are able to have their position and orientation changed by an impinging air flow.

The air pressure and air flow impinging upon the pile layer should be sufficient to exert a force on pile fibers 18 in order to reorient the fibers. The particular air pressure and air flow utilized depends upon a variety of operating factors, such as, for example, the distance between the surface of the pile layer and the apertures of the stencil portion of embossing cylinder 112, the particular design of the air distribution system of embossing cylinder 112, etc. Those of ordinary skill in the art will be readily able to select appropriate air pressures, embossing cylinder configurations, and distances between the pile layer and the embossing cylinder in order to create the desired embossed pattern.

After being embossed by embossing cylinder 112, the pile fabric is passed through a curing chamber 116 in order to cure the adhesive layer so that the embossed pattern becomes permanently set. Curing chamber 116 may be comprised of essentially any conventional curing equipment that exposes the embossed, but uncured, pile fabric to radiation to effect curing of the adhesive layer. Typical curing chambers operate by exposing the flocked fabric to a source of radiation, such as ultraviolet radiation or heat. In some preferred embodiments, curing chamber 116 comprises a gas-fired air dryer, as is well known in the art, that exposes the flocked fabric to a flow of heated air to enable convective drying and curing of the adhesive. After being cured, the embossed flocked fabric 118 exits the curing chamber and is wound onto takeup roll 120. The speed at which the fabric is conveyed through air embossing system 100 can vary depending on a number of operating factors, as apparent to those of ordinary skill in the art. For some typical embodiments, the speed could be in the range of about, for example, 25 to 150 ft/min.

Figure 3B:
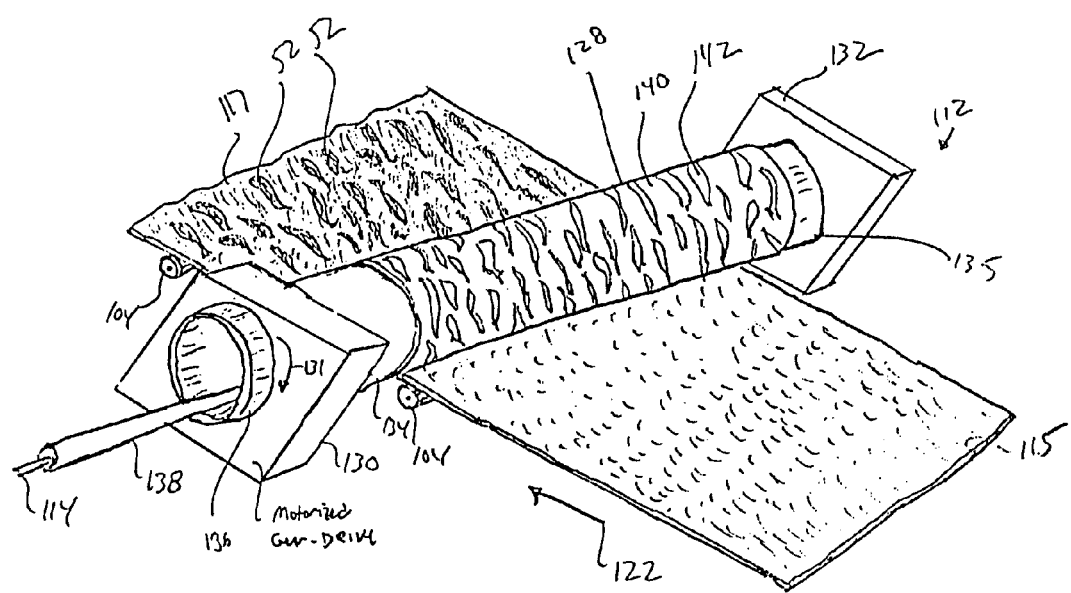
FIG. 3b is a schematic illustration of an embossing cylinder for producing an embossed pattern on a pile fabric according to one embodiment of the invention.

An embodiment of an embossing cylinder 112, which can be utilized for producing an embossing pattern similar to embossing pattern 51 shown previously in FIG. 2*a*, is shown in more detail in FIG. 3*b*. Referring to FIG. 3*b*, flocked, but unembossed fabric 115, including an uncured layer of adhesive, is conveyed toward embossing cylinder 112 in the direction shown by arrow 122, supported on its underside by support rollers 104.

Embossing cylinder 112 includes a cylindrical central region disposed above fabric 115 comprising a cylindrical screen or stencil 128, described in more detail below. The illustrated embodiment employs a conventional design for rotating the stencil 128 as fabric 115 passes thereunder. For example, in a preferred embodiment the air embossing system comprises a modified version of a commercially available air embossing system (Aigle Equipment Model No. AP-1, Burgano Toninese, Italy) as described in more detail in commonly owned co-pending International Application No. PCT/US00/13993, previously incorporated by reference. The illustrated rotating mechanism comprises a motorized drive unit 130, which includes a variable speed motor therein (not shown) which powers a conventional drive mechanism to rotate stencil 128 in the direction indicated by arrow 131. The drive mechanism for rotating the cylinder can be any suitable drive mechanism known in the art, including, but not limited to belt-drive, gear-drive, friction wheel-drive, inductive-drive, etc., as apparent to those of ordinary skill in the art. One preferred drive mechanism comprises a gear-drive mechanism in which a variable speed motor (not shown) in drive unit 130 rotates a gear (not shown) which, in turn, is engaged with a circumferential gear (not shown) comprising an outer surface of bearing flange region 134 of cylinder 112 within drive unit 130. In such an embodiment, the other end of cylinder 112 may be rotatably supported with bearing support 132 in which bearing flange region 135 is rotatably disposed. In other embodiments than that illustrated, embossing cylinder 112 may not include a separate motor drive mechanism as described, but rather may be passively rotated by the motion of fabric 115. Such passive drive mechanisms are useful for providing simple drive systems suitable for embodiments where it is desirable to synchronize the speed and direction of the embossing cylinder and the fabric. Such a passive drive mechanism is described in detail in U.S. Pat. No. 3,916,823 to Halloran, previously referred to.

Inserted into the interior portion of cylindrical stencil 128 is an air distribution lance 138, which, in preferred embodiments, extends substantially along the entire length of cylindrical stencil 128. In typical, conventional embodiments, a lower portion of air distribution lance 138 will include a series of holes therein, which holes run parallel to a longitudinal axis of lance 138 and provide fluid communication between pressurized air within lance 138 and the internal surface of cylindrical stencil 128. As illustrated, one end of air distribution lance 138 is configured for fluid communication with air supply line 114, while the other end of the lance is sealed. In alternative embodiments, both ends of air distribution lance 138 may be configured for attachment to a source of pressurized air. Air distribution lance 138 is preferably positioned with respect to cylindrical stencil 128 so that nozzles or holes in the air distribution lance 138 are positioned in close proximity to the lowest point of cylindrical stencil 128 (i.e. at a point such that the nozzles or holes in the air distribution lance which direct the flow of air to fabric 115 are as close as possible to the pile layer of fabric 115, in order to maintain a columnated air flow pattern against the flocked fabric to avoid diffusion and achieve a more precisely defined embossed pattern). A variety of conventional air distribution lances may be employed in the context in the present invention, as apparent to those of ordinary sill in the art. In preferred embodiments, however, an improved air lance, which is the subject of commonly owned co-pending International Application No. PCT/US00/13993, previously incorporated by reference, can be utilized to provide more precisely controlled air distribution, thus resulting in more sharply defined embossed patterns in the pile fabric. One embodiment of this improved air lance is described in greater detail below in the context of FIGS. 3d and 3e.

Cylindrical stencil 128 can be conventionally formed from, for example, a cylindrical screen which has a series of solid, air impermeable regions 140 therein and a series of apertures 142 therein, which apertures permit air flow therethrough. Cylindrical stencil 128 can be formed in any manner conventionally used for forming such stencils. For example, in one embodiment, cylindrical stencil 128 can be formed using a well known lacquered screen process, where a cylindrical screen, typically constructed from a polymeric material such as polyester mesh, is coated with a lacquer. In forming the stencil, for such embodiments, the screen is first coated with an essentially uniform layer of lacquer, covered with a pattern template having regions that can block ultraviolet radiation, and exposed to ultraviolet radiation which tends to cure the lacquer. The regions of the screen beneath the pattern template regions that can block ultraviolet radiation will remain uncured after exposure and can be subsequently removed from the screen, thus leaving behind on the screen a lacquer coating, forming the stencil, having apertures therein with a pattern that is complementary to that of the pattern template. In another embodiment, the stencil can be formed by coating a metal screen with a patterned metallic layer using a Galvano process well known in the art. In yet other embodiments, cylindrical stencil 128 can be formed by directly covering a cylindrical screen with an air impermeable layer, such as a paper, plastic, or other air impervious layer, and then cutting out selected portions from the air impervious layer to form apertures 142. It is to be understood, of course, that regions corresponding to apertures 142 may be cut out of the air impervious layer prior to utilizing the layer to form cylindrical stencil 128. In other embodiments, cylindrical stencil 128 may be formed from a stencil typically employed for use in rotary screen printing operations or by any other methods apparent to those of ordinary skill in the art for forming air embossing stencils.

Apertures 142 in cylindrical stencil 128 result in the formation of embossed depressions 52 in embossed fabric 117 as air passes through the apertures and impinges upon fabric 115 as it passes under embossing cylinder 112. In preferred embodiments, the outer surface of the cylindrical stencil is positioned, during the embossing operation, as close to the top surface of the pile layer of the fabric being embossed as possible while avoiding actual contact. As is apparent in FIG. 3b, the embossed depressions 52 formed by apertures 142 will typically have a similar overall shape and orientation as the apertures in cylindrical stencil 128. Accordingly, apertures 142 in cylindrical stencil 128 are constructed, shaped, and oriented with respect to the longitudinal axis of embossing cylinder 128 so that the apertures will have a shape and orientation with respect to cylindrical stencil 128 that is similar to the shape and orientation of the visually discernible regions formed by depressions 52 in fabric 117. In the embodiment illustrated, where the overall alignment of elongated embossed depressions 52 are oriented substantially along the direction of motion 122 of fabric 115, apertures 142 in cylindrical stencil 128 will have generally elongate shapes, corresponding to the overall shape of depressions 52, where the elongate shapes of the apertures have longitudinal directions or axes that are oriented substantially co-directional with a direction that is essentially perpendicular to the longitudinal axis of cylindrical stencil 128. In other words, the longitudinal directions or axes of apertures 142, in the illustrated embodiment, will be substantially circumferentially aligned with respect to cylindrical stencil 128, and will furthermore be substantially aligned with the direction of motion 122 of fabric 115.

Figure 3C:
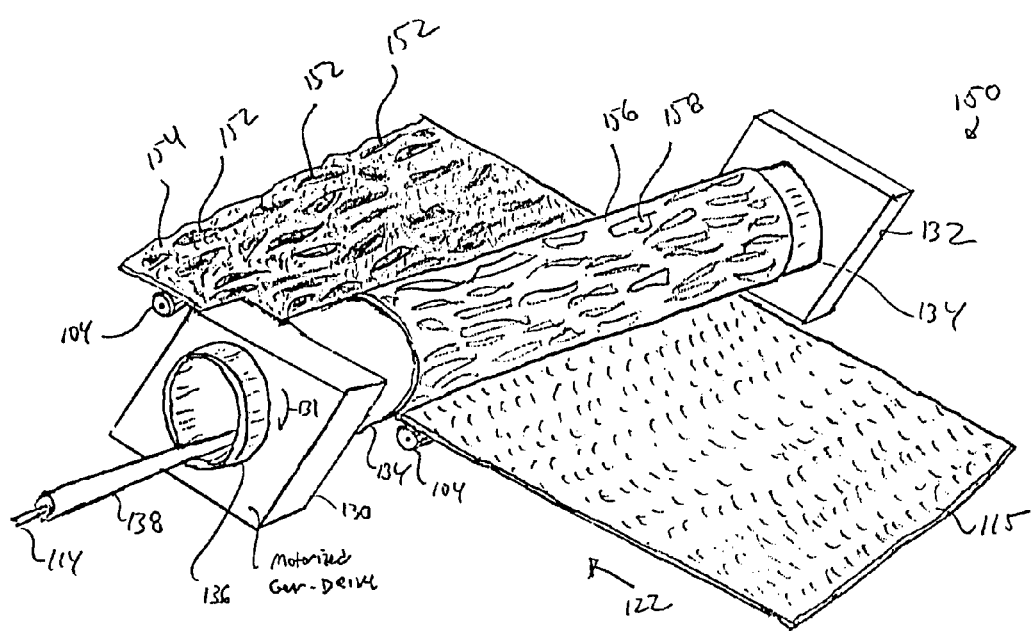
FIG. 3c is a schematic illustration of an embossing cylinder for producing an embossed pattern on a pile fabric according to another embodiment of the invention.

FIG. 3c illustrates an alternative embodiment involving an embossing cylinder 150 configured to produce a plurality of embossed depressions 152 in pile fabric 154, where the embossed depressions have generally elongate shapes that are oriented substantially in a direction essentially perpendicular to the direction of motion 122 of fabric 154. In such embodiments, embossing cylinder 150 can be provided with a cylindrical stencil 156 having a plurality of apertures 158 therein, where apertures 158 have generally elongate shapes, with longitudinal directions or axes that are oriented substantially co-directional with the longitudinal axis of cylindrical stencil 156, and substantially perpendicular to the direction of motion 122 of fabric 154.

Figure 3D:
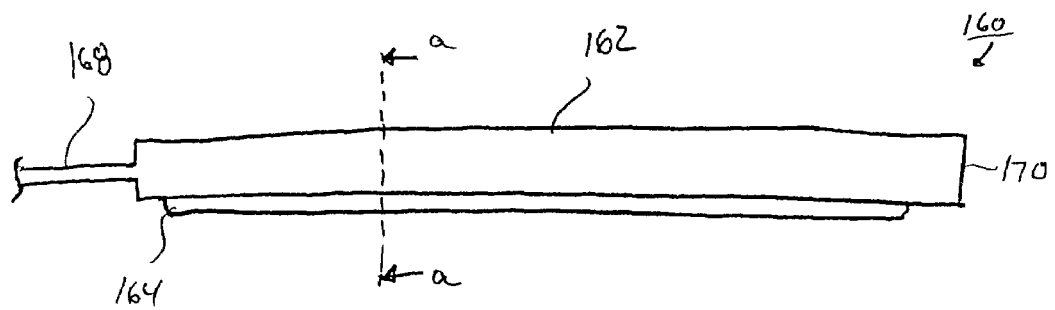
FIG. 3d is a schematic illustration of an air distribution lance for use in an air embossing process according to one embodiment of the invention.
Figure 3E:
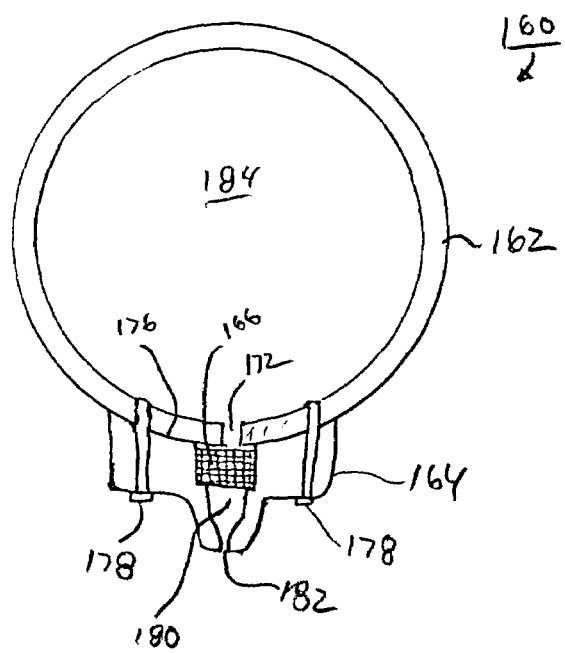
FIG. 3e is a cross-sectional view along line a—a of the air distribution lance of FIG. 3d.

One embodiment of an improved air distribution lance 160, referred to above, for use in certain preferred embodiments of an air embossing system is shown in more detail in FIGS. 3d and 3e. The illustrated improved air lance includes an air lance main body 162, an air lance nozzle forming component 164, and a nozzle insert 166 (FIG. 3e). The air lance main body or drum 162 comprises an elongated cylindrical tube with an essentially uniform cross-sectional dimension. In the particular embodiment illustrated, the length of the main body is selected to enable it to at least extend across the entire width of fabric 115 when mounted in operation. At one end of the main body or drum 162 is attached a connecting tube 168 of reduced diameter. The reduced diameter section 168 provides air inlet connections for connection to a pressurized air supply. The illustrated air lance main body 162 has a diameter of about 4 in and is preferably closed at the end 170 opposite tube 168. The main body 162 is formed with an elongated slot 172 that communicates with an air lance nozzle 164 (FIG. 3e).

The air lance nozzle forming component 164 is secured lengthwise over the slot 172 in the main body 162 and extends away from the main body in the illustrated embodiment by about 1.25 inches. The slot 172 in the main body in one preferred embodiment has an essentially uniform width of about 5/16" and extends in an essentially straight line for a preferred distance of about 64 in. The elongated nozzle forming component 164 is best illustrated in enlarged form in FIG. 3e. Nozzle forming component 164 includes a curved surface 174 that fits flush against the outer surface 176 of the main body or drum 162 and is secured to it by conventional securing means, for example by a series of bolts 178 which extend longitudinally through the nozzle forming component 164 into the main body 162. In the illustrated embodiment, these bolts 178 are arranged in pairs on either side of the slot 172 extending lengthwise of the drum 162, with the bolts 178 being essentially uniformly spaced apart.

Nozzle forming component 164 is formed with a longitudinally extending center recess 180 therein. An elongated air slit 182 forming the nozzle extends the length of nozzle forming component 164. The air slit 182 also extends the length of the recess 180 and forms a fluid communication path between the recess and the exterior environment. Air slit 182 in one preferred embodiment has a width of about 0.05 in. along its length. It should be noted that in other embodiments, the width of air slit 182 may be varied depending upon the configuration of the system and the desired embossing results. However, in general, the narrower the width of air slit 182 the greater is the detail possible to attain during the embossing process. For example, an air slit width of about 0.125 in. may be used in some embodiments but such a slit width is typically not capable of embossing the pile fabric with the same level of detail as an air slit width of about 0.05 in or less. Air slits with widths of substantially less than about 0.05 in. can provide even greater detail for embodiments where highly detailed embossed patterns are desired. For reasonable detail and for a visually significant improvement in performance over conventional air lances, the air slit 182 preferably does not substantially exceed about 0.2 in. in width.

In order to achieve even greater directionality of air flow through an embossing stencil and to further concentrate the flow of air towards the surface of the embossing stencil, a nozzle insert 166 can be employed. Insert 166 is preferably positioned within recess 180 formed in the nozzle forming component and is preferably aligned with slot 172 in main body 162. The insert, in a preferred embodiment, extending along the essentially the entire length of nozzle forming component 164 and comprising a series of honeycombed aluminum cells, each having a cross-sectional dimension of about 1/8", a length in the direction of air flow exceeding the width of the air slit 182 by at least about a factor of four, and a wall thickness of the material forming the cells of about 0.002" or less. The cells can direct air from the main body 162 with greater collimation and less turbulence through nozzle forming component 164, air slit 182, and onto the inner surface of the cylindrical embossing stencil (e.g., stencil 128 shown in FIG. 3b).

It is preferred to position air slit 182 close to the inside surface of the cylindrical embossing stencil in order to improve embossed detail. Preferably, the air sit should be positioned less than about 0.25 in. from the inside surface of the perforated cylindrical embossing screen or stencil.

In use, for example, in air embossing system 100 shown in FIG. 3a, air lance 160 is preferably connected in fluid communication with a source of compressed air sufficient to supply air to internal volume 184 of air lance 160 in order to maintain an air pressure in internal volume 184 of preferably between about 0.5 psig and about 4 psig, and in one preferred embodiment of about 0.75 psig. This pressurized air in internal volume 184 is then emitted in a very fine stream at high velocity as it flows through air slit 182 and impinges against the inner surface of the cylindrical embossing stencil. Preferably, the air flow velocity through air slit 182 will be on the order of about 15,000–25,000 ft/min. Such air flow velocity is substantially greater than for typical prior art air lance configurations.

After the flocked fabric has been formed and embossed with air embossing system 100 as described above, the embossed pile fabric 118 can then be subjected to a printing process for transferring a printed pattern, for example a printed pattern depicting a scene or illustration such as a sylvan setting, onto the embossed surface of pile fabric 118. As discussed above, a wide variety of conventional means for applying a printed pattern to flocked fabrics can be potentially utilized for forming the printed patterns according to the present invention. For example, in one embodiment, a printed pattern can be formed on the embossed pile fabric utilizing a screen printing method with specially engraved screens for various colors of the printed patterns, for example as described in commonly owned U.S. Pat. No. 5,685,223 to Vermuelen et al. incorporated herein by reference. In preferred embodiments, the printed pattern is superimposed on embossed pile fabric 118 by utilizing a paper transfer printing process utilizing transfer paper having a printed pattern thereon. Such paper transfer printing processes are well known by those of ordinary skill in the art. Prior to printing the embossed fabric using a paper transfer printing as described below, in preferred embodiments, in order to prevent flattening and ironing out of the embossed pattern, the embossed fabric, after curing the adhesive, is heat set. A variety of heat setting methods and equipment known in the art can be employed. In one embodiment, the embossed fabric can be passed through an electric, infra red oven maintained at a temperature of between about 410° F. and about 420° F. for a time period on the order of a few seconds for heat setting.

Figure 4:
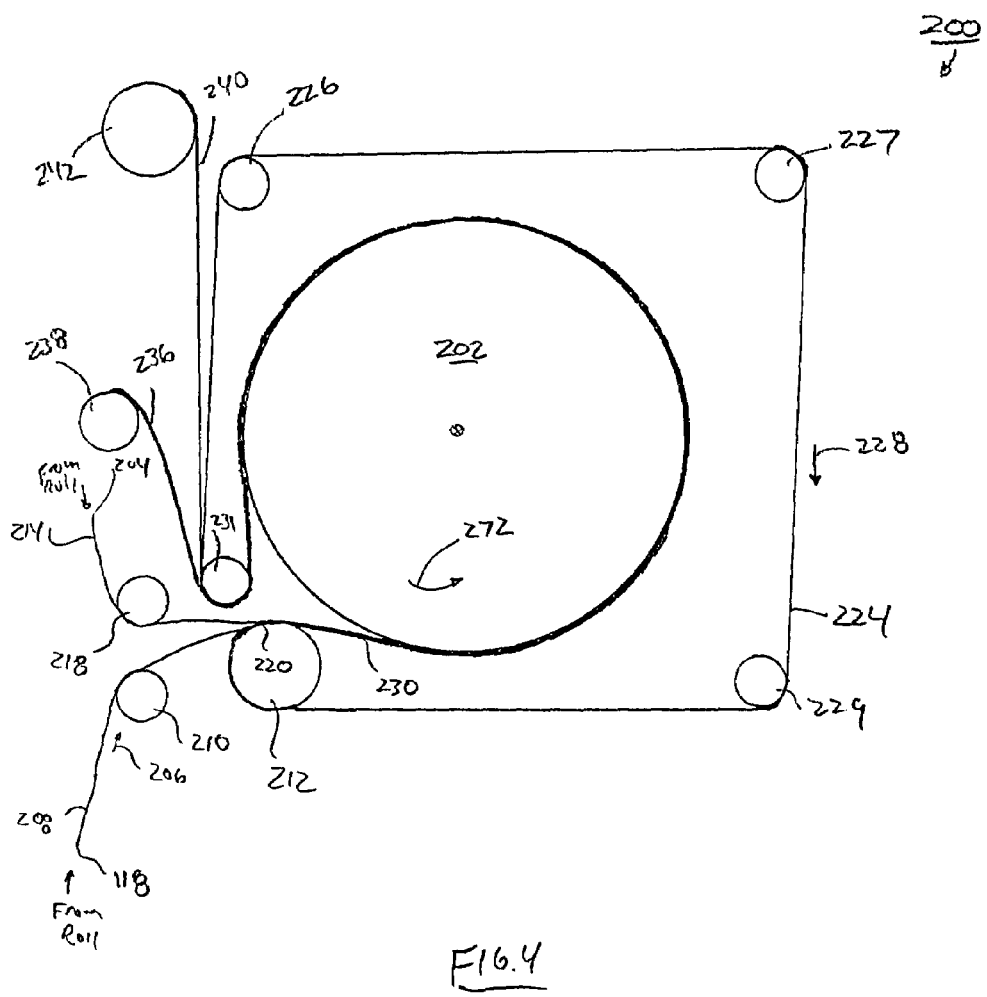
FIG. 4 is a schematic illustration of a process for producing a printed pattern on an embossed fabric according to one embodiment of the invention.
Figure 1A:
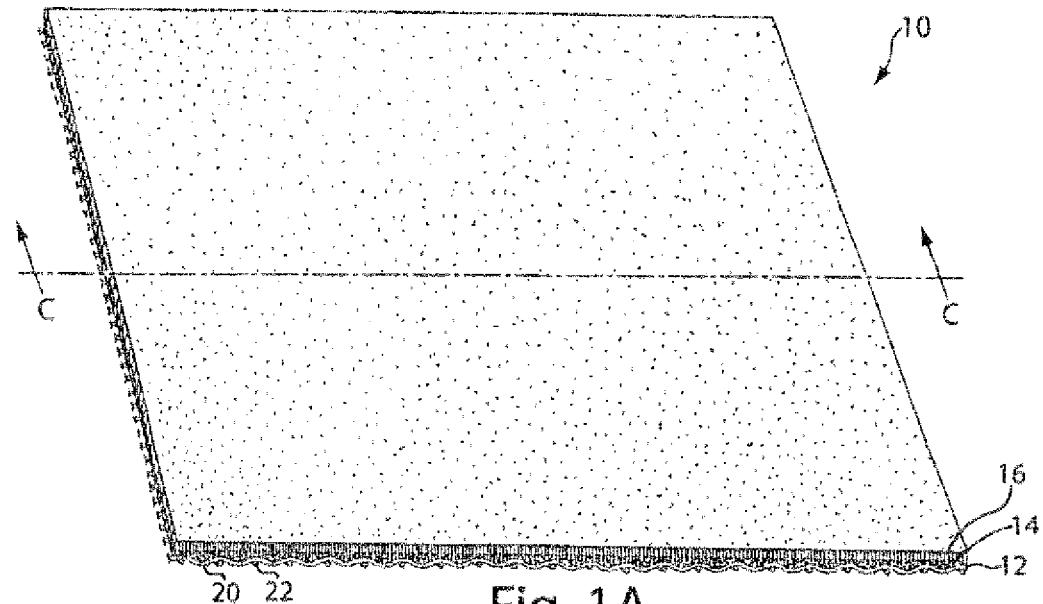
Figure 2A:
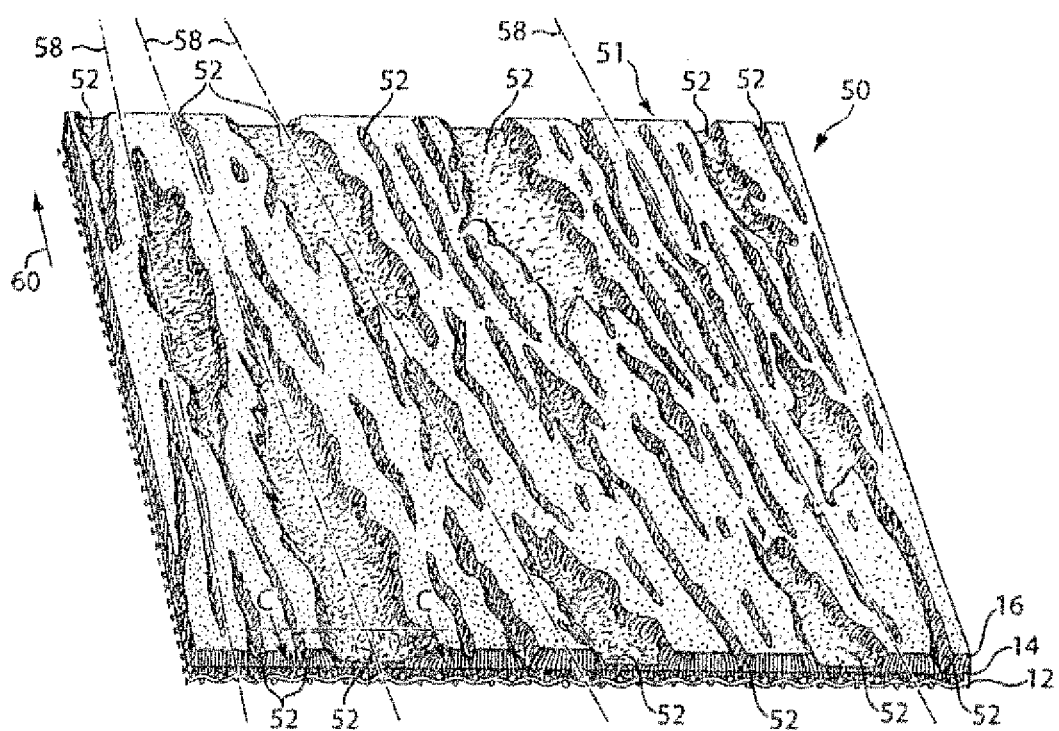
Figure 1B:
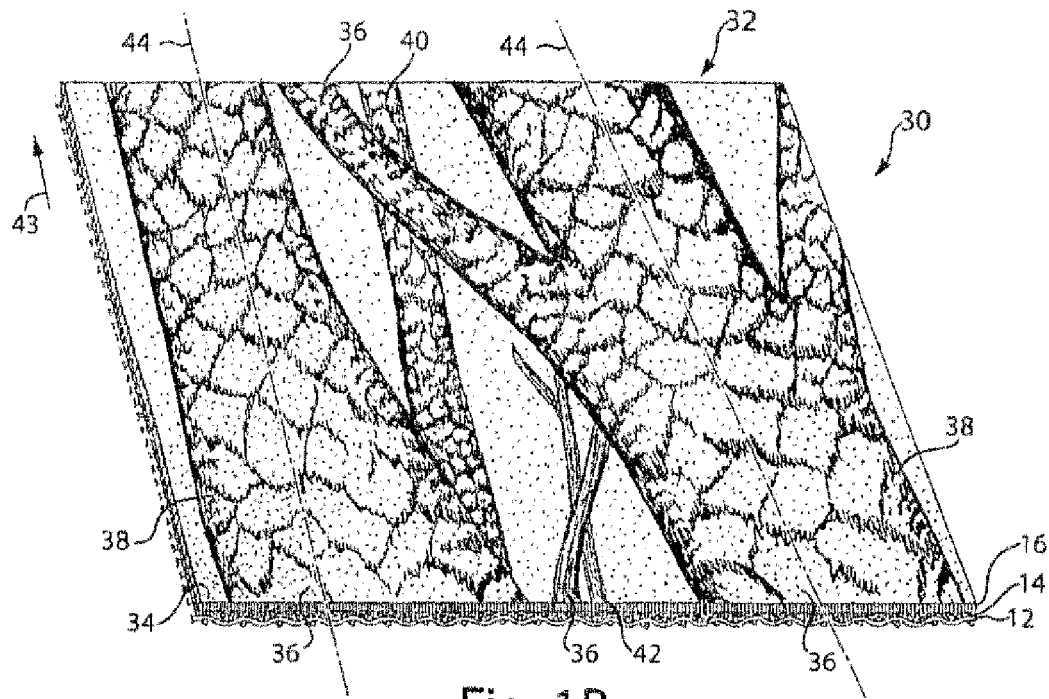
Figure 2D:
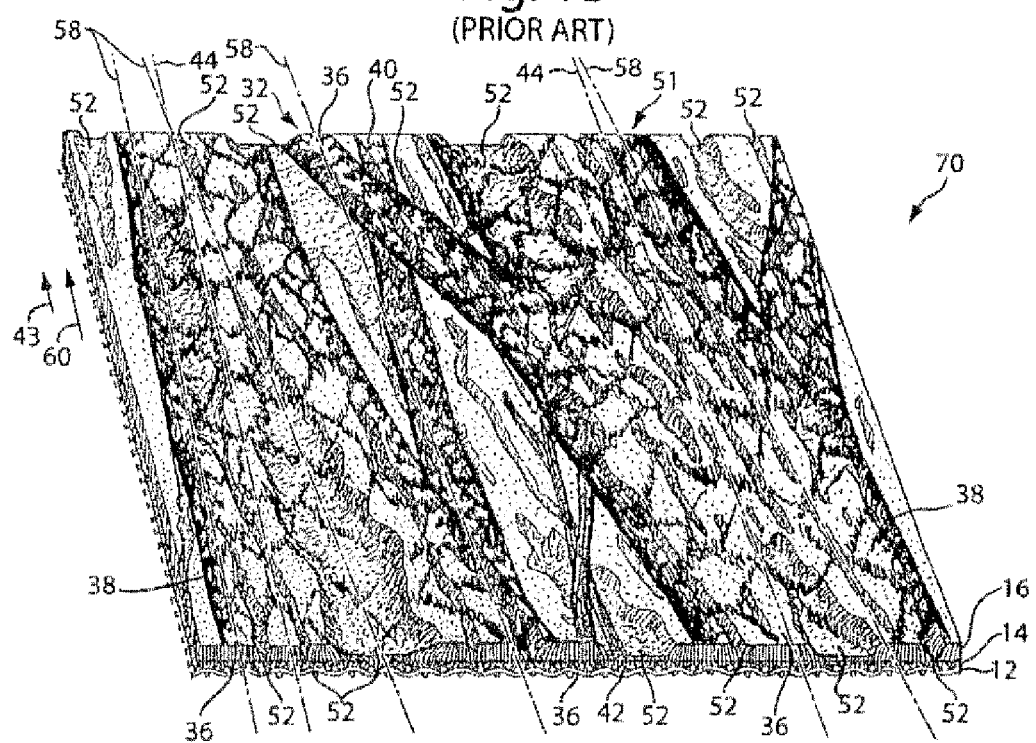
Figure 1C:
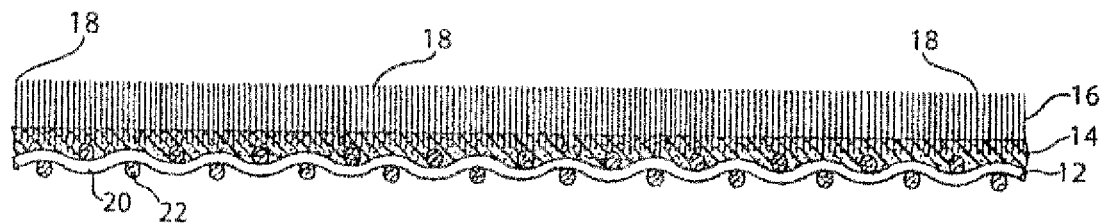
Figure 2C:
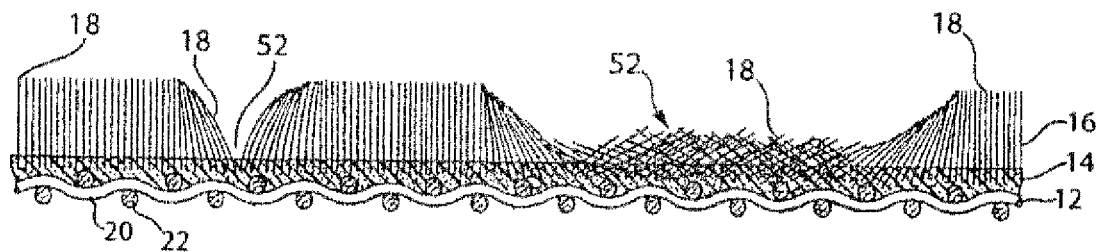
Figure 1D:
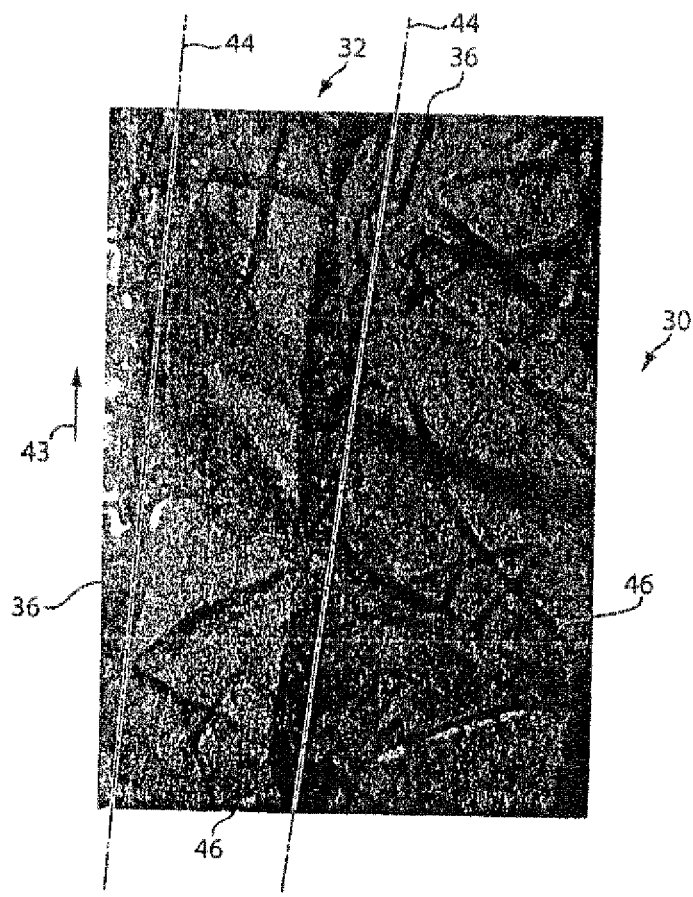
Figure 2B:
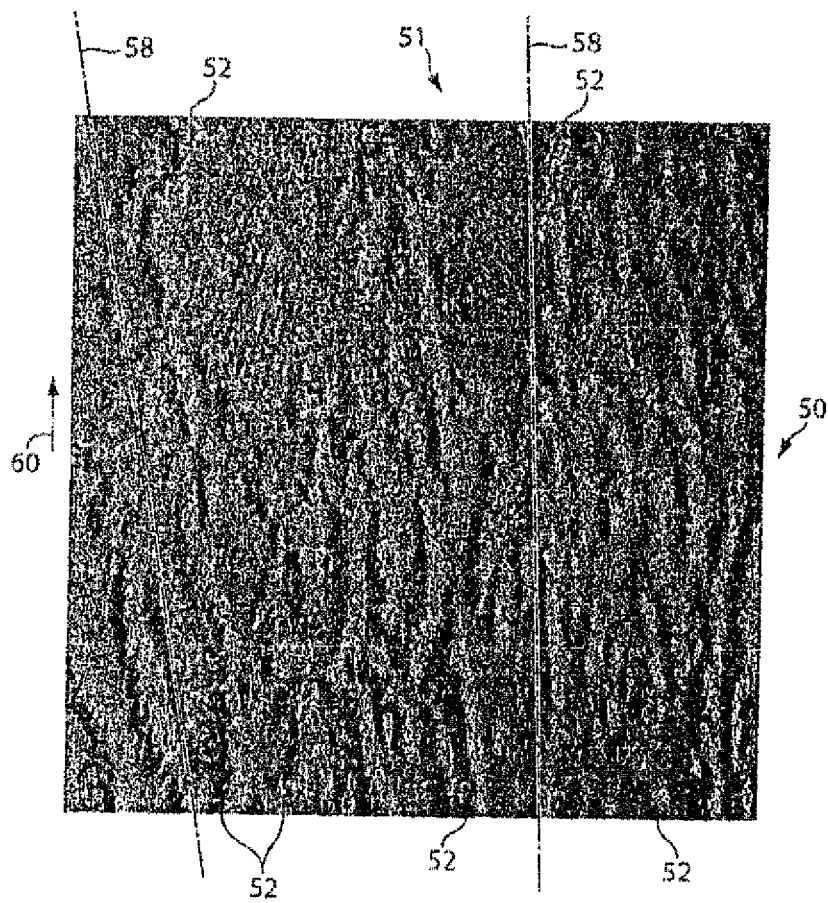
Figure 2E:
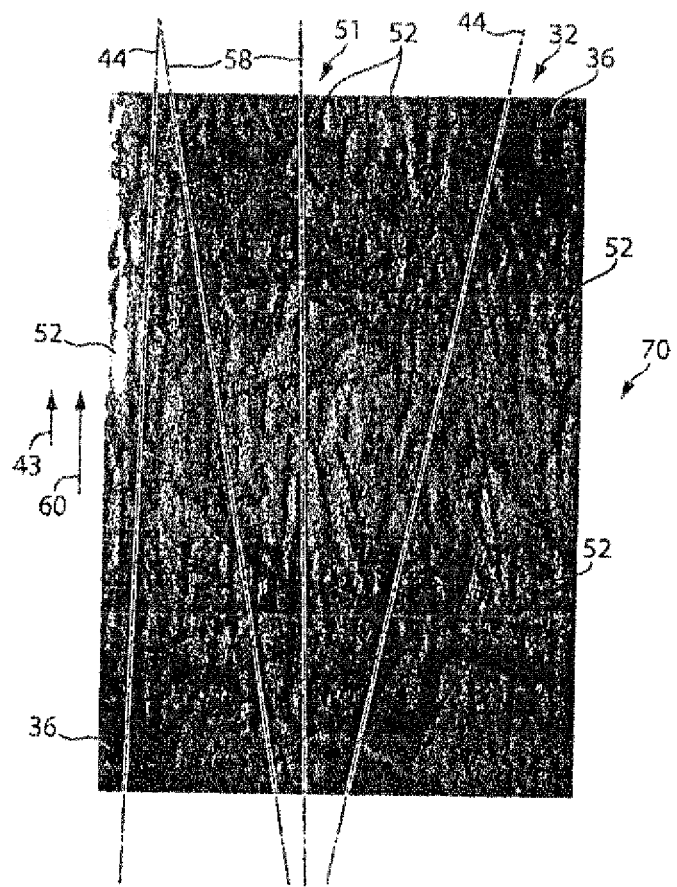
Figure 3A:
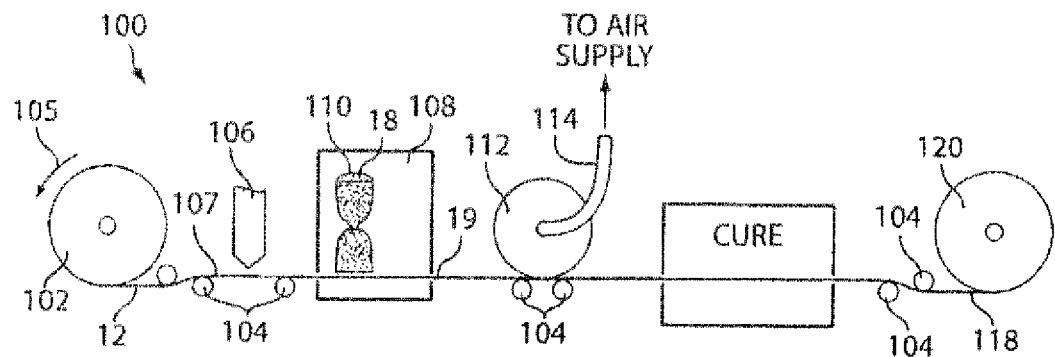
Figure 3B:
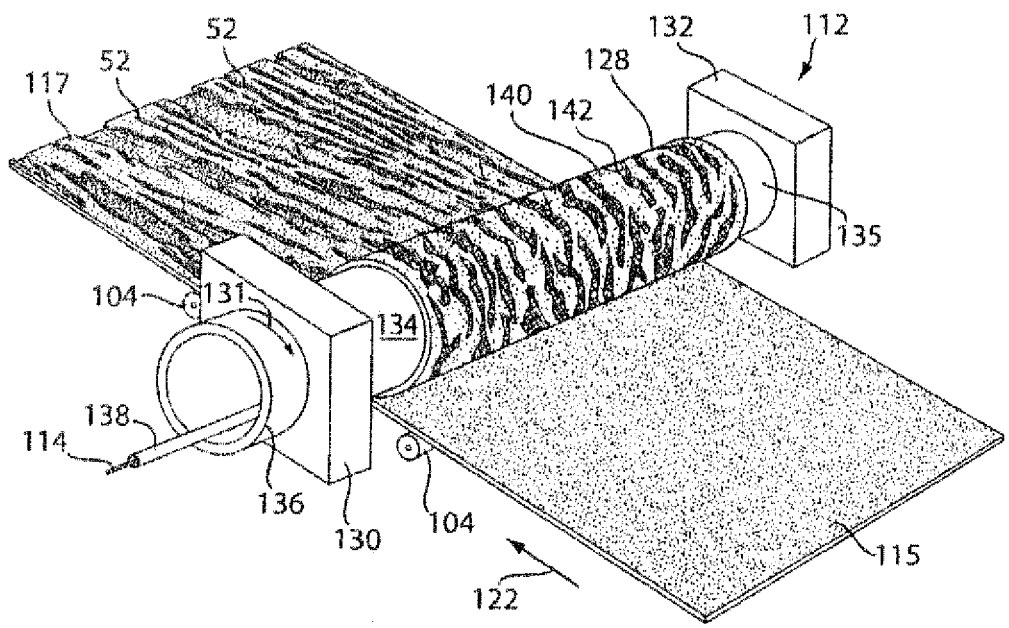
Figure 3C:
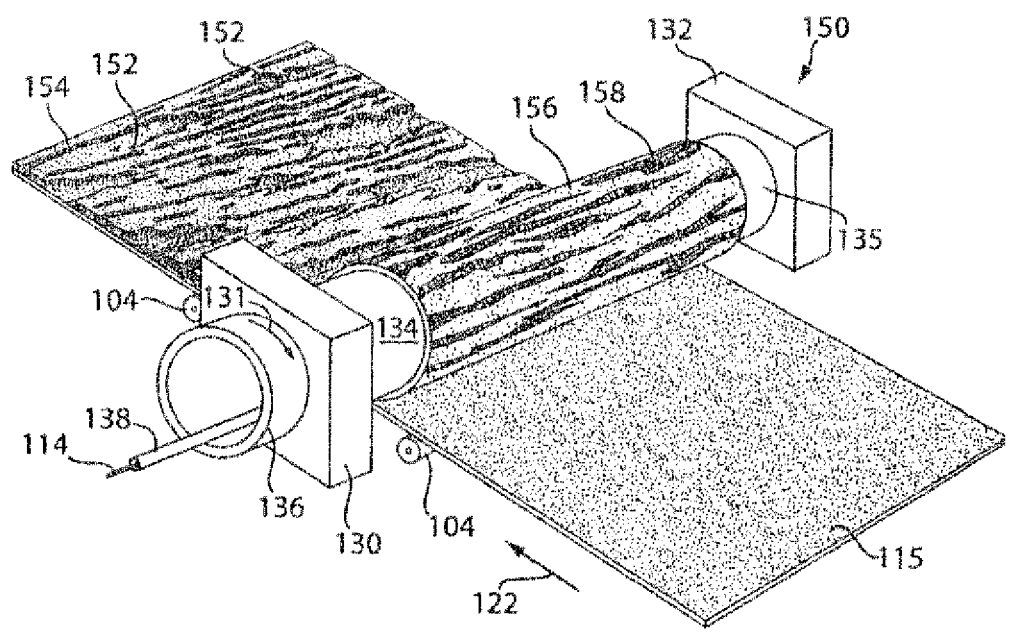
Figure 3D:
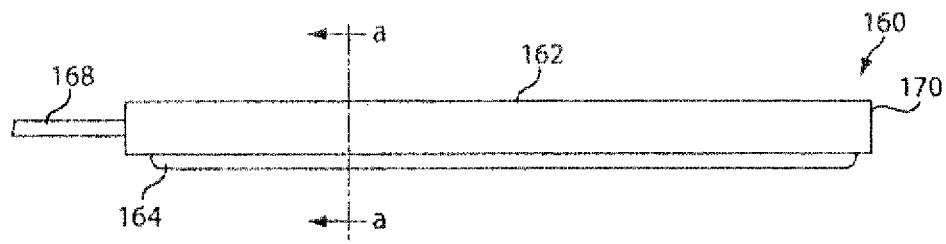
Figure 3E:
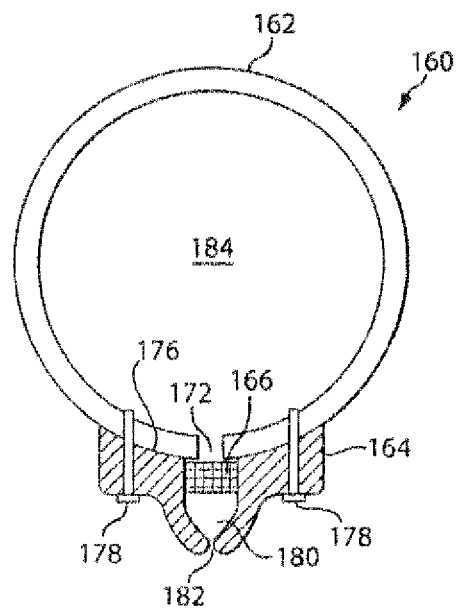
Figure 4:
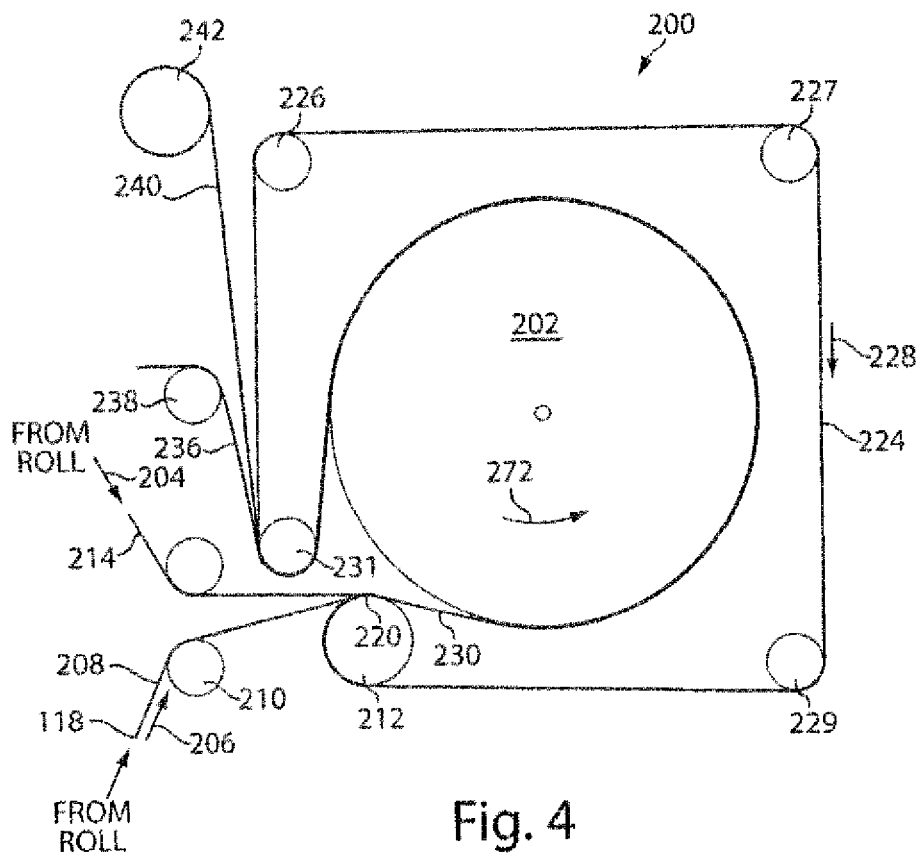

One conventional and exemplary paper transfer printing process 200 is shown in FIG. 4. Process 200 utilizes a heated callendering cylinder 202 to apply heat and pressure to transfer paper 204, having a printed pattern thereon, and embossed pile fabric 118. A method for forming a printed pattern on embossed pile fabric 118 can proceed as follows. Embossed pile fabric 118 is passed towards heated callendering cylinder 202 in a direction indicated by arrow 206. Embossed pile fabric 118 is fed to callendering cylinder 202 with its embossed pile side 208 facing toward callendering cylinder 202. Embossed pile fabric 118 passes over guide roller 210 and onto feed roller 212. At the same time, transfer paper 204 is also passed toward heated callendering cylinder 202 so that its printed side 214 faces away from heated surface 216 of callendering cylinder 202 and faces towards pile side 208 of embossed pile fabric 118. Transfer paper 204 is fed passed guide roller 218 to feed roller 212 whereupon, at contact point 220 of feed roller 212, printed side 214 of transfer paper 204 and pile side 208 of embossed pile fabric 118 are brought into contact with each other so that the printed pattern of transfer paper 204 is juxtaposed and adjacent to the embossed pile surface 208 of embossed pile fabric 118. The overlaid sandwich of transfer paper 204 and embossed pile fabric 118 is fed from feed roller 212 to heated callendering cylinder 202 and passes therearound as the heated callendering cylinder rotates in direction 272. In the illustrated embodiment, pressure is applied to the surfaces of transfer paper 204 and embossed pile fabric 118, in order to force printed side 214 of the transfer paper against pile side 208 of the embossed pile fabric, by utilizing a continuous loop of a Nomex blanket 224. Nomex blanket 224 is maintained under a predetermined degree of tension provided by tensioning roller 229, guide rollers 226, 227, and 231, and feed roller 212. The Nomex blanket passes around the system in direction 228.

At contact point 220 of feed roller 212, tensioned Nomex blanket 224 forms a third layer comprising a transfer paper/pile fabric/Nomex blanket sandwich 230 which passes around heated callender 202. As is apparent from FIG. 4, transfer paper/pile fabric/Nomex blanket sandwich 230, which is oriented with respect to heated surface 216 of callendering cylinder 202 so that Nomex blanket 224 forms the layer furthest from surface 216, with embossed pile fabric 118 forming the intermediate layer, and transfer paper 204 forming the layer adjacent to and in contact with surface 216. Tension provided by tensioning roller 229 combined with heat supplied with heated callendering cylinder 202 enables the printed pattern of transfer paper 204 to be effectively transferred to embossed pile fabric 118. The particular tension of Nomex blanket 224 for providing sufficient pressure to effectively transfer a printed pattern, and the particular temperature of heated callendering cylinder 202 will depend on the particular type of transfer paper utilized, the rotational speed and size of the heated callendering cylinder, and the characteristics of the embossed pile surface of the embossed pile fabric to which the pattern is being transferred. In typical embodiments, heated callender 202 could be about 60 in. in diameter, have a length of about 80 in., rotate at about 12–15 yd/min., and have a surface temperature maintained at about 410–420° F. A typical tension for Nomex blanket 224 can be selected to provide a normal pressure forcing the transfer paper/fabric/Nomex blanket sandwich against heated callendering cylinder of within the range of about 20–30 psi.

After being exposed to heated callendering cylinder 202, transfer paper/pile fabric/Nomex blanket sandwich 230 passes from the heated callendering cylinder and around guide roller 231 at which point, the layers of the sandwich are separated, with the used transfer paper layer 236 passing to used paper roll 238, the embossed printed pile fabric 240 passing to finished product fabric windup roll 242 and Nomex blanket 224 completing the continuous loop by passing to guide roller 226.

When forming a uniquely realistic textured pile fabric depicting a scene or illustration according to certain embodiments of the invention, for example pile fabric 70 shown previously in FIGS. 2d and 2e, the printed pattern on printed side 214 of transfer paper 204 is oriented and fed to the callendering cylinder such that some fraction of the prominent visual features of the printed pattern, which have generally elongate shapes, are oriented in a substantially similar direction as the elongate shapes of embossed features present on pile side 208 of embossed pile fabric 118. With the printed patterns and embossed patterns so aligned, when printed side 214 of transfer paper 204 is brought into contact with pile side 208 of embossed pile fabric 118, the embossed pattern and the printed pattern, depicting a scene or illustration, on the transfer paper will be juxtaposed and oriented with respect to each other such that some fraction of the printed features and embossed features are substantially aligned, thus resulting in the embossed pattern imparting a three-dimensional texture to the scene or illustration transferred to the pile fabric. As described above, such aligned texturing advantageously can impart a visual effect to the scene or illustration which renders it more realistic than a similar scene or illustration printed on a pile fabric without an embossed pattern thereon. Also, as described above, the printed pattern of transfer paper 204 and the embossed pattern on embossed fabric 118 are preferably selected so that the visually discernible embossed regions of the embossed pattern and the visible features of the printed pattern can be essentially randomly positioned with respect to each other, while still yielding the above-mentioned realistic texturing effect.

In addition to the realistic texturing effect provided by superimposing the embossed pattern and printed pattern, printing the embossed pile fabric with a printed pattern by utilizing paper transfer printing process 200 also can enhance the overall realistic visual effect imparted to the inventive fabrics by creating non-uniform color density and shading for regions of the printed pattern transferred to the embossed depressions on the embossed pile fabric as compared to regions of the printed pattern transferred to essentially smooth, unembossed regions of the pile fabric. This differential shading and color effect can be clearly seen be comparing the overall color density and shading of the printed but unembossed pile fabric 30 shown in the image of the fabric of FIG. 1d, to the inventive printed and embossed pile fabric 70 shown in the image of FIG. 2e. A visual comparison of FIG. 1d and FIG. 2e illustrates that the color density and shading of the portions of the printed pattern that are superimposed on the embossed depressions visually differs from the color density and shading of essentially equivalent portions of the printed pattern that are not superimposed on the depressions, thus yielding an enhanced visual representation of the color and texture of the scene or illustration comprising the printed pattern. As illustrated, printing process 200 comprises a separate step after completion of the formation of the embossed flocked fabric using embossing system 100. It should, however, be understood that in other embodiments, printing process 200 may comprise an integrated step in the overall air embossing system. For example, printing process 200 could be inserted in air embossing system 100 at any position downstream of curing component 116.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, or method described herein. In addition, any combination of two or more such features, systems or methods, provided that such features, systems, or methods are not mutually inconsistent, is included within the scope of the present invention.

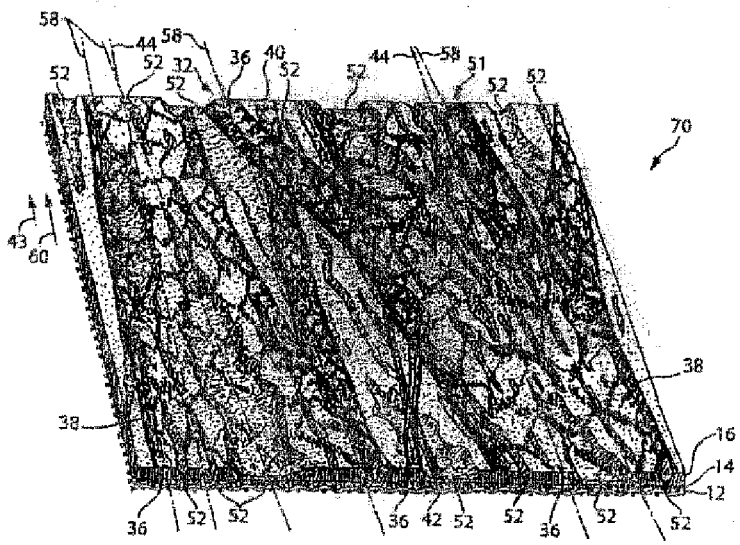

What is claimed:

1. A fabric comprising:
   a substrate layer;
   an adhesive layer disposed on one surface of the substrate layer; and
   at least one layer of pile attached to and extending from the adhesive layer,
   the pile layer having an embossed pattern thereon, the embossed pattern including a plurality of visually discernable regions having generally elongate shapes with longitudinal axes of the shapes being oriented substantially along a first direction,
   the pile layer further having a printed pattern superimposed upon the embossed pattern, the printed pattern including a plurality of visible features having generally elongate shapes with longitudinal axes of the shapes being oriented substantially along the first direction, wherein
   at least some of the visible features of the printed pattern include portions thereof not contained within the visually discernible regions of the embossed pattern,
   wherein the fabric is a camouflage fabric,
   wherein the printed pattern is characterized by a scene or illustration, and wherein the embossed pattern imparts a three-dimensional texture to the scene or illustration, the texture imparting a visual effect to the scene or illustration which renders it more realistic than the scene or illustration without the superimposed embossed pattern,
   wherein the scene or illustration represents a sylvan setting, and
   wherein the scene or illustration comprises at least one visible feature comprising a tree or portion thereof, a branch or portion thereof, a bush or portion thereof, a leaf or portion thereof, a flower or portion thereof, a berry, grass, a rock or portion thereof, and/or moss.

2. The fabric as in claim 1, wherein the embossed pattern simulates bark.

3. The fabric as in claim 1, wherein the visually discernable regions of the embossed pattern comprise depressions in a surface of the pile layer.

4. The fabric as in claim 3, wherein the embossed pattern is formed by air embossing the pile layer.

5. The fabric as in claim 1, wherein the visually discernable regions of the embossed pattern and the visible features of the printed pattern are essentially randomly positioned with respect to each other.

6. The fabric as in claim 1, wherein the plurality of visually discernable regions of the embossed pattern are substantially non-uniform in length and width.

7. The fabric as in claim 1, wherein the printed pattern is formed by a heat transfer printing process.

8. The fabric as in claim 3, wherein a color and shading of the portions of the printed pattern superimposed on the depressions visually differs from a color and shading of essentially equivalent portions of the printed pattern that are not superimposed on the depressions, thus yielding an enhanced visual representation of color and texture of the scene or illustration.

9. A fabric comprising:
   a substrate layer;
   an adhesive layer disposed on one surface of the substrate layer; and
   at least one layer of pile attached to and extending from the adhesive layer,
   the pile layer having superimposed thereupon an embossed pattern and a printed pattern, the printed pattern characterized by a scene or illustration, wherein the embossed pattern imparts a three-dimensional texture to the scene or illustration, the texture imparting a visual effect to the scene or illustration which renders it more realistic than the scene or illustration without the superimposed embossed pattern,
   wherein the fabric is a camouflage fabric,
   wherein the embossed pattern includes a plurality of visually discernable regions having generally elongate shapes with longitudinal axes of the shapes being oriented substantially along a first direction,
   wherein the printed pattern includes a plurality of visible features having generally elongate shapes with longitudinal axes of the shapes being oriented substantially along the first direction,
   wherein the scene or illustration represents a sylvan setting, and
   wherein the scene or illustration comprises at least one visible feature comprising a tree or portion thereof, a branch or portion thereof, a bush or portion thereof, a leaf or portion thereof, a flower or portion thereof, a berry, grass, a rock or portion thereof, and/or moss.

10. The fabric as in claim 9, wherein the embossed pattern simulates bark.

11. The fabric as in claim 9, wherein the visually discernable regions of the embossed pattern comprise depressions in a surface of the pile layer.

12. The fabric as in claim 9 wherein the embossed pattern is formed by air embossing the pile layer.

13. The fabric as in claim 9, wherein the visually discernable regions of the embossed pattern and the visible features of the printed pattern are essentially randomly positioned with respect to each other.

14. The fabric as in claim 9, wherein the plurality of visually discernable regions of the embossed pattern are substantially non-uniform in length and width.

15. The fabric as in claim 9, wherein the printed pattern is formed by a heat transfer printing process.

16. The fabric as in claim 11, wherein a color and shading of the portions of the printed pattern superimposed on the depressions visually differs from a color and shading of essentially equivalent portions of the printed pattern that are not superimposed on the depressions, thus yielding an enhanced visual representation of color and texture of the scene or illustration.

17. A camouflage fabric produced by a method comprising:
   air embossing a pile fabric to form an air embossed pattern thereon, the air embossed pattern including a plurality of visually discernable regions having generally elongate shapes with longitudinal axes of the shapes being oriented substantially along a first direction; and
   printing the fabric with a printed pattern, the printed pattern depicting an illustration of a sylvan setting that includes a plurality of visible features having generally elongate shapes with longitudinal axes of the shapes being oriented substantially along the first direction.

* * * * *

UNITED STATES PATENT AND TRADEMARK OFFICE
CERTIFICATE OF CORRECTION

| | | |
|---|---|---|
| PATENT NO. | : 7,229,680 B1 | |
| APPLICATION NO. | : 09/666813 | |
| DATED | : June 12, 2007 | |
| INVENTOR(S) | : Cromton | |

It is certified that error appears in the above-identified patent and that said Letters Patent is hereby corrected as shown below:

The title page, showing an illustrative figure, should be deleted and substitute therefor the attached title page.

Delete drawing sheets 1-10, and substitute therefor the drawing sheets, consisting of FIGS. 1A - FIG 4, As shown on the attached pages.

Signed and Sealed this

Third Day of November, 2009

David J. Kappos
*Director of the United States Patent and Trademark Office*

(12) United States Patent
Crompton

(10) Patent No.: US 7,229,680 B1
(45) Date of Patent: Jun. 12, 2007

(54) REALISTICALLY TEXTURED PRINTED FLOCKED FABRICS AND METHODS FOR MAKING THE FABRICS

(75) Inventor: Kevin R. Crompton, Westport, MA (US)

(73) Assignee: Microfibres, Inc., Pawtucket, RI (US)

( * ) Notice: Subject to any disclaimer, the term of this patent is extended or adjusted under 35 U.S.C. 154(b) by 395 days.

(21) Appl. No.: 09/666,813

(22) Filed: Sep. 21, 2000

Related U.S. Application Data

(60) Provisional application No. 60/155,077, filed on Sep. 21, 1999.

(51) Int. Cl.
*B32B 33/00* (2006.01)
*B32B 3/02* (2006.01)
*B32B 3/26* (2006.01)

(52) U.S. Cl. .................. 428/89; 428/88; 428/90; 428/919

(58) Field of Classification Search .................. 428/90, 428/88, 89, 96, 919
See application file for complete search history.

(56) References Cited

U.S. PATENT DOCUMENTS 774,890 A  11/1904  Mutterer (Continued)

FOREIGN PATENT DOCUMENTS

CA   2024768   3/1991

(Continued)

OTHER PUBLICATIONS

Examination Report for a corresponding Turkish patent application, serial No. 2002/00721, issued Apr. 2, 2004 by the Preliminary Examining Authority, Federal Institute of Intellectual Property, Russia.

(Continued)

*Primary Examiner*—Cheryl A. Juska
(74) *Attorney, Agent, or Firm*—Wolf, Greenfield & Sacks, P.C.

(57) ABSTRACT

The present invention is directed to unique flocked pile fabrics and methods for producing such fabrics. The fabrics provided according to one embodiment of the invention include an embossed pattern, characterized by a plurality of elongated depressions in the surface of the pile fabric, and a superimposed printed pattern, characterized by a scene or illustration including a plurality of visual features having elongated shapes. The inventive embossed, printed pile fabrics, having a superimposed embossed and printed pattern, advantageously superimpose the embossed pattern and the printed pattern upon the pile fabric so that the embossed pattern imparts a three-dimensional texture to the scene or illustration or pattern comprising the printed pattern. The texture provided by the embossed pattern can impart a visual effect to the scene or illustration which can render it more realistic than a similar scene or illustration printed upon a conventional unembossed pile fabric. In one embodiment, this unique texturing effect is accomplished by substantially aligning the longitudinal axes of the elongate features of the printed pattern and the elongate features of the embossed pattern. The pile fabric provided by the invention can be produced by utilizing a plurality of embossing and printing techniques. In one embodiment, the embossing technique comprises air embossing, and the printing technique comprises paper transfer printing utilizing a paper transfer sheet. The fabrics provided by the invention are especially useful as camouflage fabrics. Such fabrics typically include a printed scene or illustration representing a sylvan setting dominated by visual features such as trees, branches, bushes, leaves, flowers, berries, grass, rocks, moss, etc.

17 Claims, 11 Drawing Sheets